US010206522B2

(12) United States Patent
Yang et al.

(10) Patent No.: US 10,206,522 B2
(45) Date of Patent: Feb. 19, 2019

(54) DISPLAY SYSTEMS AND METHODS

(71) Applicant: Apple Inc., Cupertino, CA (US)

(72) Inventors: Sheng Yang, Mountain View, CA (US); Charles A. Schwalbach, Menlo Park, CA (US); Russell John Kaaihue Heirakuji, Cupertino, CA (US); Carly Lynn Marasco, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 364 days.

(21) Appl. No.: 14/600,607

(22) Filed: Jan. 20, 2015

(65) Prior Publication Data

US 2015/0208826 A1 Jul. 30, 2015

Related U.S. Application Data

(60) Provisional application No. 61/996,963, filed on Jan. 24, 2014, provisional application No. 62/068,581, filed on Oct. 24, 2014.

(51) Int. Cl.
*A47F 3/00* (2006.01)
*A47F 7/024* (2006.01)
(Continued)

(52) U.S. Cl.
CPC .............. *A47F 3/004* (2013.01); *A47F 3/002* (2013.01); *A47F 7/0246* (2013.01); *E05B 73/00* (2013.01);
(Continued)

(58) Field of Classification Search
CPC ........ A47F 3/004; A47F 3/002; A47F 7/0246; E05B 73/0082; F16M 11/041;
(Continued)

(56) References Cited

U.S. PATENT DOCUMENTS

D244,857 S 6/1977 Hayes
4,066,231 A * 1/1978 Bahner ................. B43M 99/00
248/289.11
(Continued)

FOREIGN PATENT DOCUMENTS

CN 201489627 U 5/2010
CN 201814222 U 5/2011
(Continued)

OTHER PUBLICATIONS

Photograph believed taken before Jan. 8, 2014.
(Continued)

*Primary Examiner* — Anita M King
(74) *Attorney, Agent, or Firm* — Sterne, Kessler, Goldstein & Fox P.L.L.C.

(57) ABSTRACT

A display system and method for displaying a product is disclosed. The system may include a display stem and a retainer for holding the product. The retainer may include a bracket and a retainer body having a substantially smooth surface. The display stem may include a recess for receiving at least a portion of the retainer body. The retainer may be oriented on top of the display stem in one or more predetermined positions through the use of magnetic forces. The retainer may be returned to and held on top of the display stem using a retaining cable. The retainer body and recess may include charging contacts for delivering power to a product held by the retainer when the retainer body is received within the recess.

46 Claims, 25 Drawing Sheets

(51) Int. Cl.
*F16M 11/04* (2006.01)
*G06F 1/16* (2006.01)
*F16M 11/14* (2006.01)
*F16M 13/02* (2006.01)
*E05B 73/00* (2006.01)
*G08B 13/14* (2006.01)
*G08B 13/02* (2006.01)

(52) U.S. Cl.
CPC ....... *E05B 73/0082* (2013.01); *F16M 11/041* (2013.01); *F16M 11/14* (2013.01); *F16M 13/02* (2013.01); *G06F 1/16* (2013.01); *G08B 13/02* (2013.01); *G08B 13/1463* (2013.01); *F16M 2200/021* (2013.01)

(58) Field of Classification Search
CPC ...... F16M 11/14; F16M 200/021; G06F 1/16; G08B 13/1463; F16C 11/06; F16C 11/106
USPC ............ 248/551, 206.5, 181.1, 181.2, 183.3, 248/288.31, 288.51
See application file for complete search history.

(56) References Cited

U.S. PATENT DOCUMENTS

| | | | |
|---|---|---|---|
| D314,501 S | 2/1991 | Pagano | |
| 5,604,484 A | 2/1997 | Rogers | |
| D407,408 S | 3/1999 | Hoff | |
| 5,906,031 A | 5/1999 | Jensen | |
| 6,234,703 B1* | 5/2001 | Bieg | F16C 11/0619 403/115 |
| 6,476,717 B1 | 11/2002 | Gross et al. | |
| D510,358 S | 10/2005 | Ezure | |
| 7,154,039 B1 | 12/2006 | Marszalek et al. | |
| 7,209,038 B1 | 4/2007 | Deconinck et al. | |
| D542,279 S | 5/2007 | Chan | |
| D545,826 S | 7/2007 | Richter | |
| 7,287,652 B2* | 10/2007 | Scholen | A47F 7/02 211/26 |
| D589,962 S | 4/2009 | Maruyama et al. | |
| D590,184 S | 4/2009 | Barabas et al. | |
| D599,241 S | 9/2009 | Andre et al. | |
| 7,614,601 B2* | 11/2009 | Marsilio | A47F 7/024 248/178.1 |
| D612,837 S | 3/2010 | Murray | |
| 7,710,266 B2 | 5/2010 | Belden, Jr. et al. | |
| 7,724,135 B2 | 5/2010 | Rapp et al. | |
| 7,740,214 B2 | 6/2010 | Marsilio et al. | |
| 7,748,669 B2* | 7/2010 | Lu | F16M 11/14 248/181.1 |
| D628,203 S | 11/2010 | Noble | |
| D629,405 S | 12/2010 | Crysell | |
| D645,047 S | 9/2011 | Wike | |
| 8,020,816 B2 | 9/2011 | Laitila et al. | |
| D652,422 S | 1/2012 | Cheng | |
| 8,087,625 B2 | 1/2012 | Chang | |
| 8,145,821 B2 | 3/2012 | Mead et al. | |
| D663,972 S | 7/2012 | Alexander et al. | |
| D696,259 S | 12/2013 | Howarth et al. | |
| D696,674 S | 12/2013 | Vogel | |
| 8,602,376 B2* | 12/2013 | Vogel | F16M 11/14 248/187.1 |
| D704,199 S | 5/2014 | Byun | |
| 8,749,387 B2 | 6/2014 | Fawcett et al. | |
| D709,066 S | 7/2014 | Byun | |
| 8,814,128 B2* | 8/2014 | Trinh | A47F 7/024 248/187.1 |
| 8,900,009 B2* | 12/2014 | Hornick | H01R 13/73 248/288.51 |
| 9,097,379 B1* | 8/2015 | Strasser | F16M 11/04 |
| 9,303,809 B2* | 4/2016 | Reynolds | F16M 11/041 |
| 2007/0114346 A1* | 5/2007 | Omps | F16C 11/0619 248/181.1 |
| 2007/0145211 A1 | 6/2007 | Marsilio et al. | |
| 2008/0169923 A1 | 7/2008 | Belden et al. | |
| 2009/0079566 A1* | 3/2009 | Goldstein | G08B 13/1463 340/568.1 |
| 2009/0173863 A1 | 7/2009 | Crown | |
| 2009/0229089 A1 | 9/2009 | Galant | |
| 2011/0036960 A1* | 2/2011 | Li | F16C 11/106 248/288.31 |
| 2011/0047844 A1 | 3/2011 | Fawcett et al. | |
| 2011/0068919 A1 | 3/2011 | Rapp et al. | |
| 2011/0084838 A1 | 4/2011 | Fawcett | |
| 2011/0187531 A1 | 8/2011 | Oehl et al. | |
| 2011/0309934 A1 | 12/2011 | Henson et al. | |
| 2012/0037783 A1 | 2/2012 | Alexander et al. | |
| 2012/0188082 A1 | 7/2012 | Berglund et al. | |
| 2012/0280810 A1 | 11/2012 | Wheeler | |
| 2013/0026309 A1 | 1/2013 | Ball et al. | |
| 2013/0134287 A1* | 5/2013 | Gresset | A47F 3/002 248/551 |
| 2014/0060218 A1* | 3/2014 | Bisesti | F16M 11/04 73/865.8 |
| 2014/0106608 A1* | 4/2014 | Howarth | F16M 13/02 439/531 |
| 2014/0226298 A1* | 8/2014 | Palmer | H05K 5/0208 361/807 |

FOREIGN PATENT DOCUMENTS

| | | |
|---|---|---|
| CN | 203016422 U | 6/2013 |
| GB | 2481370 A | 12/2011 |
| TW | M463084 U | 10/2013 |

OTHER PUBLICATIONS

Notification of Transmittal of the International Search Report and the Written Opinion of the International Searching Authority, or the Declaration in PCT/US2015/012467, dated Jul. 20, 2015, 18 pages.

* cited by examiner

DISPLAY SYSTEMS AND METHODS

CROSS-REFERENCE TO RELATED APPLICATIONS

This application claims benefit of the following provisional applications: U.S. Application No. 61/996,963, filed on Jan. 24, 2014, and U.S. Application No. 62/068,581, filed on Oct. 24, 2014, each of which is incorporated herein in its entirety by reference thereto.

FIELD

The described embodiments relate generally to display systems and methods for displaying a product. More particularly, the embodiments relate to a display stem and product retainer for displaying a consumer product within in a retail store.

BACKGROUND

A retailer or other person may desire to make a product available for use (e.g., testing) by a potential purchaser or other person. In some cases, the retailer may further desire to limit the potential purchaser's ability to remove the product from a display area.

SUMMARY

A retailer may have a display model product that is representative of products that are available for purchase by a purchaser. In order to entice such a purchase, the retailer may make the display model available for use by the potential purchaser. To promote such use, a retailer may further desire to present the product in a consistent and aesthetically-pleasing way, thereby further enticing the potential purchaser to handle and test the item, and to minimize the interference of elements of a display stand with the potential purchaser's viewing and use of the product. The retailer, however, may desire to limit the ability of the potential purchaser to remove the display model from a display area (e.g., to prevent theft or other unauthorized use).

To accomplish this, the retailer may use a display system or elements thereof according to embodiments described herein.

In some embodiments, a display system for displaying a product includes a retainer for retaining the product, the retainer including a retainer body, wherein at least a portion of the retainer body defines a hemispherical shape, and a bracket attached to the retainer body, the bracket including at least two bracket arms configured to extend around opposing sides of the product, and a display stem defining a recess at a proximal end thereof, the recess shaped to receive the hemispherical portion of the retainer body.

In some embodiments, a display system for displaying a product includes a retainer for retaining the product, the retainer including a retainer body having a plurality of first charging contacts on its outer surface, where at least a portion of the retainer body is hemispherical. The system may also include a display stem defining a recess shaped to receive the hemispherical retainer body, where the recess includes a plurality of second charging contacts. The first charging contacts and the second charging contacts may be in electrical communication when the retainer body is in the recess.

In some embodiments, a display system for displaying a product includes a retainer for retaining the product, the retainer including a retainer body having at least one first magnet coupled thereto, and a bracket attached to the retainer body, the bracket including at least two bracket arms configured to extend around opposing sides of the product, and a display stem defining a recess at a proximal end thereof, the recess defining an opening and least one second magnet disposed adjacent to the opening, wherein the at least one first magnet is configured to cause rotation of the retainer body to a predefined orientation when at least a portion of the retainer body is disposed within the recess of the display stem, if the retainer body is not in the predefined orientation, and wherein the at least one first magnet is configured to cause the rotation by magnetic attraction to the at least one second magnet.

In some embodiments, a display system for displaying a product includes a retainer for retaining the product, the retainer including a retainer body having a plurality of first magnets. The system may also include a display stem defining a recess and an opening, and the display stem may include a plurality second magnets disposed adjacent to the opening, the plurality of second magnets having alternating positive and negative polar orientations. The plurality of first magnets may be configured to cause rotation of the retainer body to at least one predefined orientation when at least a portion of the retainer body is disposed within the recess of the display stem, if the retainer body is not in the predefined orientation, and the plurality of first magnets may cause the rotation by magnetic attraction to a plurality of the second magnets having the opposite polarity as the plurality of first magnets.

In some embodiments, a display system for displaying a product includes a retainer body, at least one first magnet coupled to the retainer body, the at least one first magnet configured to cause rotation of the retainer body to a predefined orientation when at least a portion of the retainer body is disposed within a display stem, if the retainer body is not in the predefined orientation.

In some embodiments, a display system for displaying a product includes a retainer body; and a bracket attached to the retainer body, the bracket including at least two bracket pieces, each bracket piece having a bracket arm for extending around opposing sides of the product. The system may also include an auxiliary cable having an auxiliary plug, where the retainer body defines a plug recess to receive at least a portion of the auxiliary plug, and where a portion of each bracket piece wraps around at least a portion of the plug recess and the auxiliary cable to retain the auxiliary plug within the plug recess.

In some embodiments, a retainer for retaining a product includes a retainer body having a peak area, a base area, and a substantially smooth curved outer surface, and a bracket attached to the retainer body, the bracket including at least two bracket arms configured to retain the product with respect to the retainer, wherein at least a portion of the substantially smooth curved outer surface has a continuously changing slope extending from the peak area to the base area.

In some embodiments, a method of displaying a product includes retaining the product with respect to a retainer, wherein the retainer comprises a body defining a substantially smooth outer surface, retracting the retainer onto a distal end of a display stem using a tensioned cable coupled to the retainer and extending through the display stem, and orienting the retainer to a predefined orientation with respect to the display stem using magnetic forces if the retainer is not in the predefined orientation.

In some embodiments, a method of detaching a cable to a product retainer includes positioning a cable connected to a product retainer within a notch of a disconnect tool, inserting at least two pins of a disconnect tool into at least two disconnect apertures located on the product retainer on opposing sides of a cable attached to the product retainer, and actuating a release mechanism disposed within the product retainer in response to the insertion of the at least two pins, where the at least two pins are disposed on opposing sides of the notch.

BRIEF DESCRIPTION OF THE DRAWINGS

The disclosure will be readily understood by the following detailed description in conjunction with the accompanying drawings, where like reference numerals designate like structural elements, and in which.

DETAILED DESCRIPTION

Figure 1:
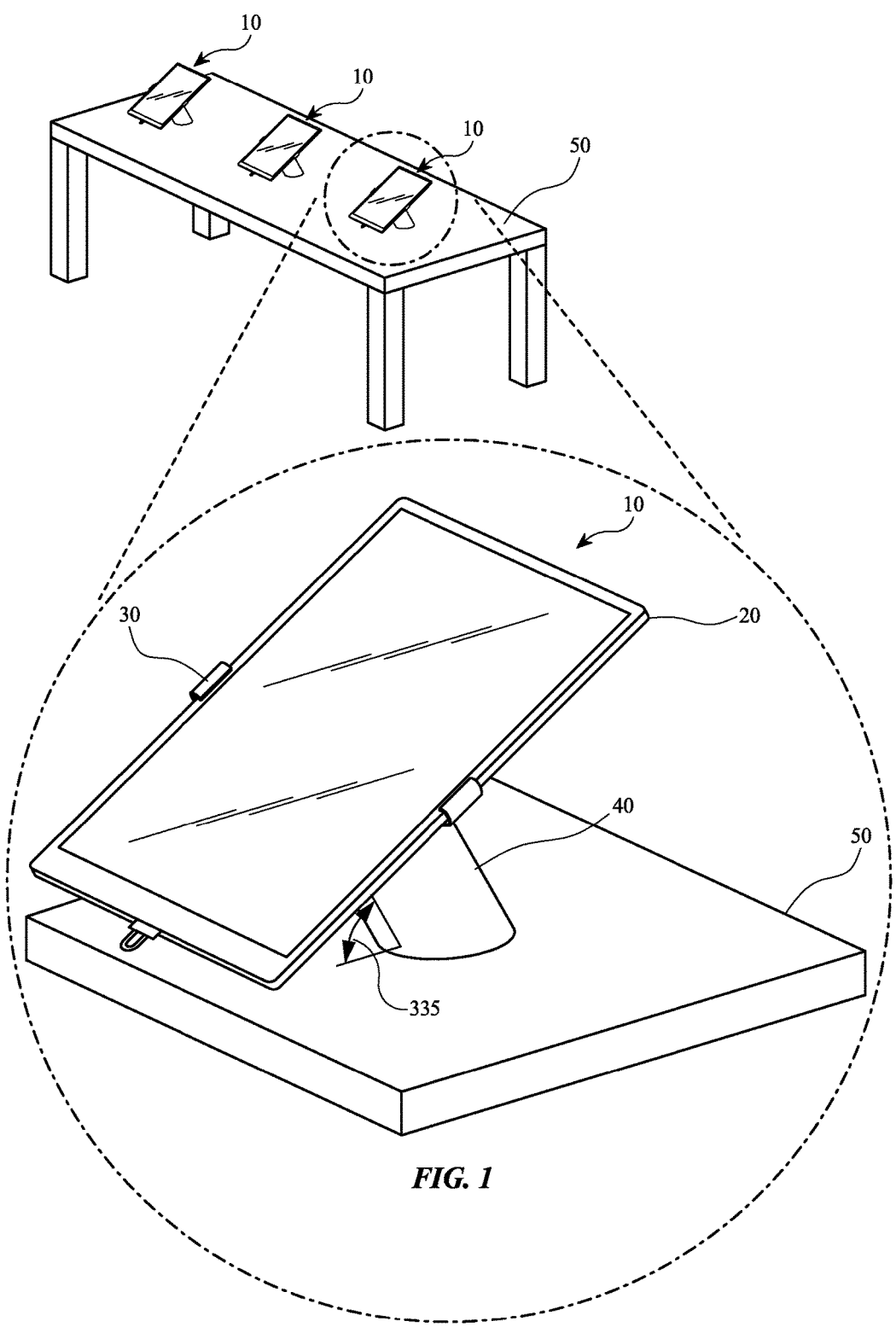
FIG. 1 shows a display system holding a product according to an embodiment.

Reference will now be made in detail to representative embodiments illustrated in the accompanying drawings, in which like reference numerals are used to indicate identical or functionally similar elements. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

References to "one embodiment", "an embodiment", "some embodiments", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A retailer may have a display model product that is representative of products that are available for purchase by a purchaser. In order to entice such a purchase, the retailer may make the display model available for use by the potential purchaser. The retailer, however, may desire to limit the ability of the potential purchaser to remove the display model from a display area (e.g., to prevent theft or other unauthorized use). To accomplish this, the retailer may use a stand as described herein, which may include security features. Although this document describes its display stand in terms of a retailer providing a display model for use by a potential purchaser, the display stand can be applied to any other suitable situation (e.g., any situation where use of an item is desired to be limited) such as, for example, a kiosk where a user may use displayed item, or a customer service station.

A retailer that makes a product available for use by a potential purchaser may further desire to present the product in an aesthetically-pleasing way, thereby further enticing the potential purchaser to handle and test the item, and to minimize the interference of elements of a display stand with the potential purchaser's viewing and use of the product. To further entice the potential purchaser, it may be desired that the display stand be configured to provide a consistent and aesthetically-pleasing appearance, so as to not detract from a potential purchaser's experience when viewing, handling, and testing the item.

As described, embodiments of the present invention relate to a system and method for displaying a product. The system may include a display stem and a retainer that cooperate to present a product to a user. The retainer may be attached to a back side of a product (e.g., an electronic device such as, for example, a phone, a tablet computer, a camera, a music player, a personal computer, a laptop computer, or a computer peripheral) and may include a bracket that wraps around the back and sides of the product. The retainer may be hidden from view when the product is retained on the display stand. Such a low-profile design may increase aesthetic appeal of the product by minimizing potentially distracting visual impact attributable to the retainer. This may focus a potential customer's attention on the product rather than the retainer or display stem configuration. The display stem may include a recess for receiving at least a portion of the retainer, thereby hiding at least a portion of it from view. The retainer may be oriented within the recess in one or more predetermined positions so as to be indexed to such positions. For example, the retainer may be oriented to indexed positions by magnetic forces (e.g., magnets corresponding to the indexed positions).

In some embodiments, the retainer may be movably coupled to the stem. For example, it may have a seated position where the retainer rests relative to the stem and a released position where the retainer is movable and free from the stem. In some embodiments, the retainer may be coupled to a retaining cable that provides a length of cable that can be drawn out of the stem to allow a potential purchaser to remove the retainer, with a product secured thereon, from the stem. The retaining cable may allow a user to pick up and handle a product secured to the retainer, while preventing theft of the product. The retainer may include a bracket that secures a product to the retainer. The bracket may be configured as a single part or multiple parts. In some embodiments, the bracket includes two parts that couple together around a product thereby securing the product to the retainer.

A retailer may also desire that the display model be returned to its original location and orientation on its display stand after a potential purchaser has finished handling the display model, so that it is presented to the next potential purchaser in the location and orientation desired by the retailer. This can present an ordered, aesthetically-pleasing retail environment. Embodiments of the present invention can automatically return the display model to its original position and orientation on the display stand. For example, a retaining cable attached to a retainer coupled to the display model may retract to pull the device onto its display stem when the display model is released by a person handling it. And, in some embodiments, the retainer may have a shape so that it automatically seats into a recess of the display stem under the tension of the retaining cable, and does not get caught on a rim of the recess (e.g., a hemispherical shape). Further, in some embodiments, one or more alignment mechanisms such as, but not limited to, magnetic elements, may be used to automatically return the display model to its original location and orientation (or into one or more indexed orientations). For example, magnet elements of the retainer may rotate the retainer within the recess by their magnetic attraction to magnet elements of the display stem, thereby automatically rotating the display model with respect to the stem until it is in one of the indexed locations (e.g., predetermined desired orientations). For example, the retainer may have alignment mechanisms that cause it to index to any desired orientation and/or number of orientations. In some embodiments, it may index to four orientations: 0°, 90°, 180°, and 270°. Such orientations may correspond to portrait and landscape orientations for a display screen of the displayed item, which may orient displayed content to correspond to each orientation of the retainer as it is rotated between indexed positions.

The retainer may provide power to a product secured thereon. In some embodiments, the retainer may include charging contacts configured to electrically communicate with corresponding charging contacts located on a display stem in order to provide power to a product. In some embodiments, the corresponding charging contacts may only be in electrical communication when the retainer is properly seated on the display stem (e.g., fully seated within a recess of the display stem in a predetermined orientation). In some embodiments, alignment mechanisms such as, but not limited to, magnetic elements may be used to facilitate the proper seating of the retainer on the display stem and thus facilitate electrical communication between the corresponding charging contacts.

These and other embodiments are discussed below with reference to FIGS. 1-25. However, those skilled in the art will readily appreciate that the detailed description given herein with respect to these Figures is for explanatory purposes only and should not be construed as limiting.

As shown in FIG. 1, embodiments of the present invention include a display system 10 for displaying a product 20 having a retainer 30 and a support system 50. Product 20 can be an item displayed for sale (e.g., as a display model). Support system 50 can support retainer 30 having product 20 fixed thereto. In some embodiments, support system 50 is a table, shelf, wall, or other retail display structure. Support system 50 may be the same as or similar to support system 300 described herein. Display system 10 can be used to display and hold product 20 and may allow product 20, fixed to retainer 30, to be removed from support system 50 (e.g., for handling by a potential purchaser) while still retaining product 20. Support system 50 may include a display stem 40 for displaying and holding retainer 30 having product 20 fixed thereto. In some embodiments, display stem 40 may be the same as or similar to display stem 304 described herein. In some embodiments, retainer 30 may be the same as or similar to retainer 200 described herein. In some cases product 20 may be interactive, and may include a display screen. Potential purchasers may be able to pick product 20 up off of display stem 40 and return it thereto, or rotate product 20 on display stem 40 and interact with it while it remains supported on display stem 40.

To display and hold product 20 in an easily-accessible, rotatable, and returnable manner, retainer 30 and display stem 40 may be separable, and may removably mate with each other (e.g., by a node of retainer 30 (e.g., a protrusion therefrom, forming a body of the retainer) that interfaces with a recess of display stem 40 (or vice versa). For example, the node may be received within the recess while product 20 is supported by display stem 40. The node may be configured to move within the recess. Retainer 30 and display stem 40 may have various shapes configured to interface with each other. In some embodiments, at least a portion of the node is sized and dimensioned (shaped) to correspond with at least a portion of the recess. The node and recess may be the positive/negative of one another. In some embodiments, the recess and node may have corresponding rounded shapes including, but not limited to, cylindrical shapes, sloping cylindrical shapes, egg shapes, and hemispherical shapes. Such rounded shapes may help facilitate rotation of product 20 on display stem 40, and removal or replacement of product 20 on display stem 40.

To help keep product 20 at a desired orientation for display, or at one of a number of desired orientations, in some embodiments display system 10 includes an alignment mechanism, which may be an indexing mechanism to align product 20 to one of multiple indexed positions. Such indexing mechanism may cause displayed product 20 to automatically rotate relative to display stem 40 to one of the indexed orientations. In some embodiments the indexing mechanism of display system 10 is indexed to cause product 20 to rotate to one of 0°, 90°, 180°, 270°, to match the normal viewing orientations of a display screen of product 20. For example, some display screens can auto-rotate in 90 degree increments depending on their orientation, so that displayed media is oriented right-side-up. Media displayed on such a product 20 retained by display system 10 will then be oriented right-side-up in portrait or landscape mode, since display system 10 can auto-rotate product 20 into one of portrait or landscape orientation.

Figure 2:
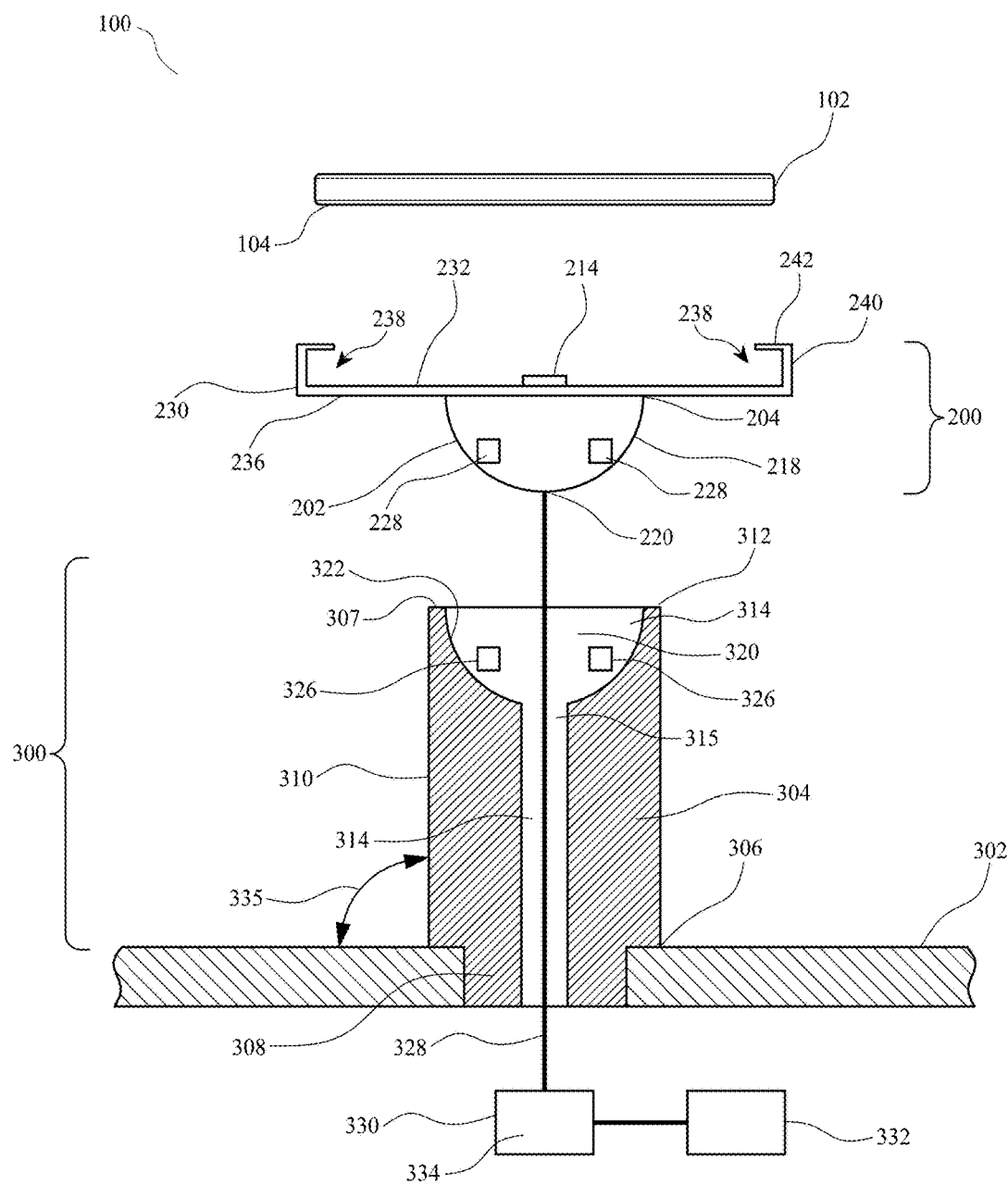
FIG. 2 shows a cross-sectional view of a display system according to an embodiment.

FIG. 2 shows a display system 100 for displaying a product 102 according to some embodiments. Display system 100 may generally correspond to display system 10 described above. Display system 100 may include a retainer 200 and a support system 300. As shown in FIG. 2, support system 300 can support retainer 200 having product 102 fixed thereto. Display system 100 can be used to display and hold product 102 and may allow product 102, fixed to retainer 200, to be removed from support system 300 (e.g., for handling by a potential purchaser) while still retaining product 102. As shown in FIG. 2, this may be accomplished using a retaining cable 328 attached to retainer 200. Retaining cable 328 can be refracted within (and/or through) support system 300 when product 102, fixed to retainer 200, is replaced on support system 300, as described further below.

As shown in FIG. 2, retainer 200 includes a retainer body 202 and a bracket 230 for holding product 102. Retainer body 202 has an outer surface 218 with a lower area 204 and an upper area 220 (e.g., a base area 204 and a peak area 220). Base area 204 of retainer body 202 includes a fixing surface 206 that is engaged with a bottom surface 236 of bracket 230. Peak area 220 is an area or point of outer surface 218 that is farthest from base area 204. In some embodiments, peak area 220 is farthest from base area 204 in a direction orthogonal to at least a portion of fixing surface 206. In some embodiments, at least one first magnetic element, such as at least one first magnet 228, is coupled to retainer body 202. In some embodiments, at least one first magnet 228 forms a portion of outer surface 218. In some embodiments, at least one first magnet 228 is embedded within retainer body 202 (e.g., within a cavity thereof). Retaining cable 328 may attach to retainer body 202 (e.g., via a coupling element 222, see FIG. 5). And retaining cable 328 may be secured to retainer body 202 using any suitable technique including, but not limited to, one or more of adhesives (e.g., glue or epoxy), screw-type fittings, friction-type fittings, luer lock fittings, or welding. In some embodiments retaining cable 328 attaches to retainer body 202 at or adjacent to peak area 220, along a central axis of retainer body 202. In some embodiments, a plurality (e.g., 2, 3, or 4) of first magnets 228 are disposed around retaining cable 328 (e.g., about a center axis of retainer body 202). In some embodiments, the plurality of first magnets 228 are equidistant from each other about retaining cable 328.

Additionally, retainer body 202 may include a security switch 214 on fixing surface 206. Security switch 214 may be used to detect whether or not product 102 is attached to retainer 200, and can trigger an alarm in response to product 102 being removed from retainer 200. For example, in some embodiments, when product 102 is coupled to retainer body 202, product 102 may engage (or disengage) security switch 214 (e.g., by backside 104 of product 102 depressing a button of security switch 214). Security switch 214 may be communicatively coupled to an alarm or other alert such that the alert can be triggered by removal of product 102 from retainer body 202. Such removal of product 102 from retainer body 202 may disengage (or engage) security switch 214, thereby triggering the alert. In some embodiments, retainer body 202 may include indicators 256 for altering a user that product 102 has been removed from retainer body 202 (see, e.g., FIGS. 11 and 13). Indicators 256 may include, but are not limited to, lights (e.g., light-emitting diode (LEDs)) and/or audio indicators such as buzzers or ringers. In some embodiments, display stem 304 may alternatively or additionally include indicators 256. In some embodiments, the alert may also be triggered in the event that retaining cable 328 is severed.

Bracket 230 includes bottom surface 236 and a top surface 232. In some embodiments bracket 230 may include one or more bracket arms 238. When product 102 is fixed to retainer 200, a backside 104 of product 102 in some embodiments may rest on fixing surface 206 and top surface 232, and bracket arms 238 aid in securing product 102 to retainer 200. Each bracket arm 238 includes a vertical support 240 and a horizontal support 242.

As shown in FIG. 2, support system 300 includes a support 302 and a display stem 304. Support 302 can be, for example, a structural feature of a building or an article of furniture. For example, support 302 can be a tabletop, a countertop, a shelf, a floor, a ceiling, or a wall. A distal end 306 of display stem 304 is fixed to support 302. In some embodiments, distal end 306 is fixed to support 302 in such a way that removal without damaging support system 300 can be achieved only with specialized tools and/or access not available to potential purchasers, and/or can be achieved only by operations likely to attract attention (e.g., fasteners accessible only from underneath a display table or only un-fastenable with a non-standard tool).

Display stem 304 can extend from support at any angle 335, for example, 90° as shown in FIG. 2, or at an oblique angle 335 as shown in FIG. 1. Such oblique angle 335 may be, for example, 45°, 20°, or 7°. Display stem 304 may be connected to support 302 via distal end 306 and a connector 308 (see, for example, FIG. 10). Display stem 304 may be a hollow structure defined by a stem wall 310 and a passage 314. In some embodiments, display stem 304 may be cylindrical or frustoconical. A recess 320, located at a proximal end 312 of display stem 304, forms the upper most part of passage 314. Distal to recess 320, passage 314 may narrow (e.g., at throat area 315). Throat area 315 may be directly distal to recess 320, and in some embodiments, is located in an upper half of display stem 304. In some embodiments, recess 320 may be formed by an insert 318 attached to proximal end 312 of display stem 304 (see, e.g., FIG. 15).

Figure 8:
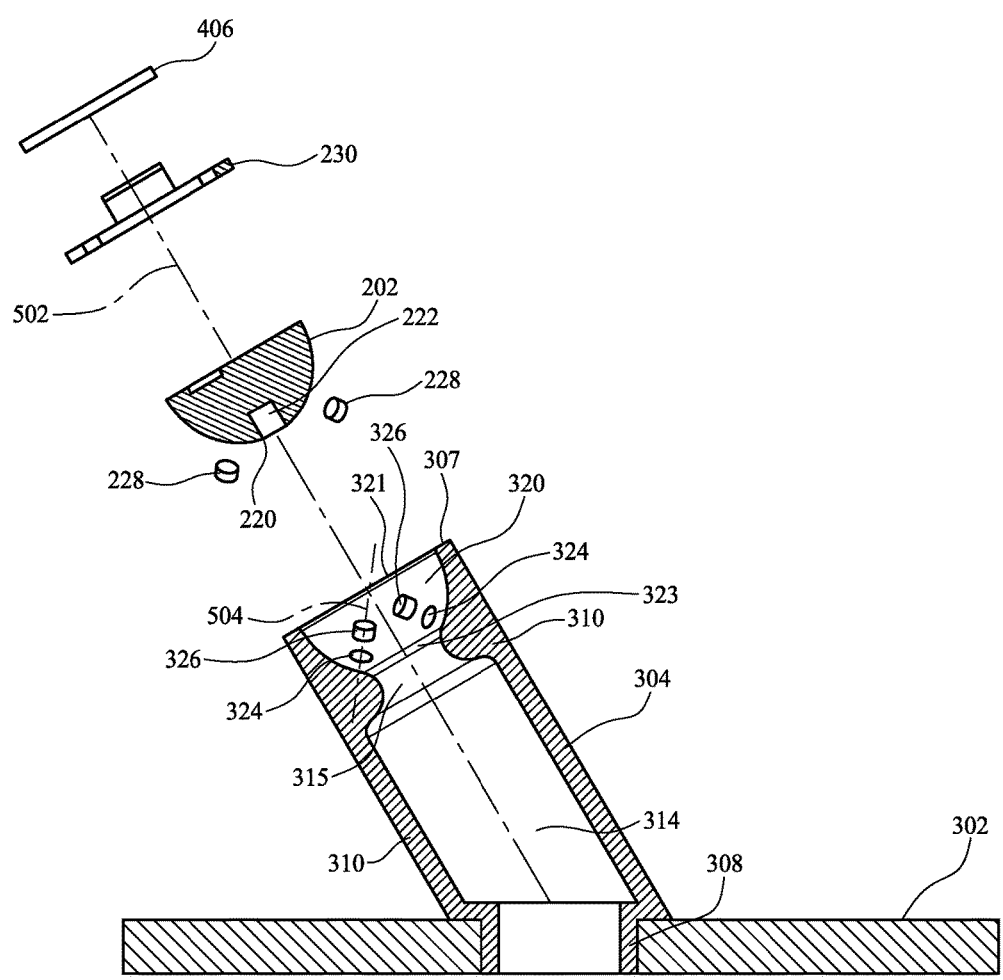
FIG. 8 shows a cross-sectional view of the display system shown in FIG. 7 along line 8-8'.
Figure 9:
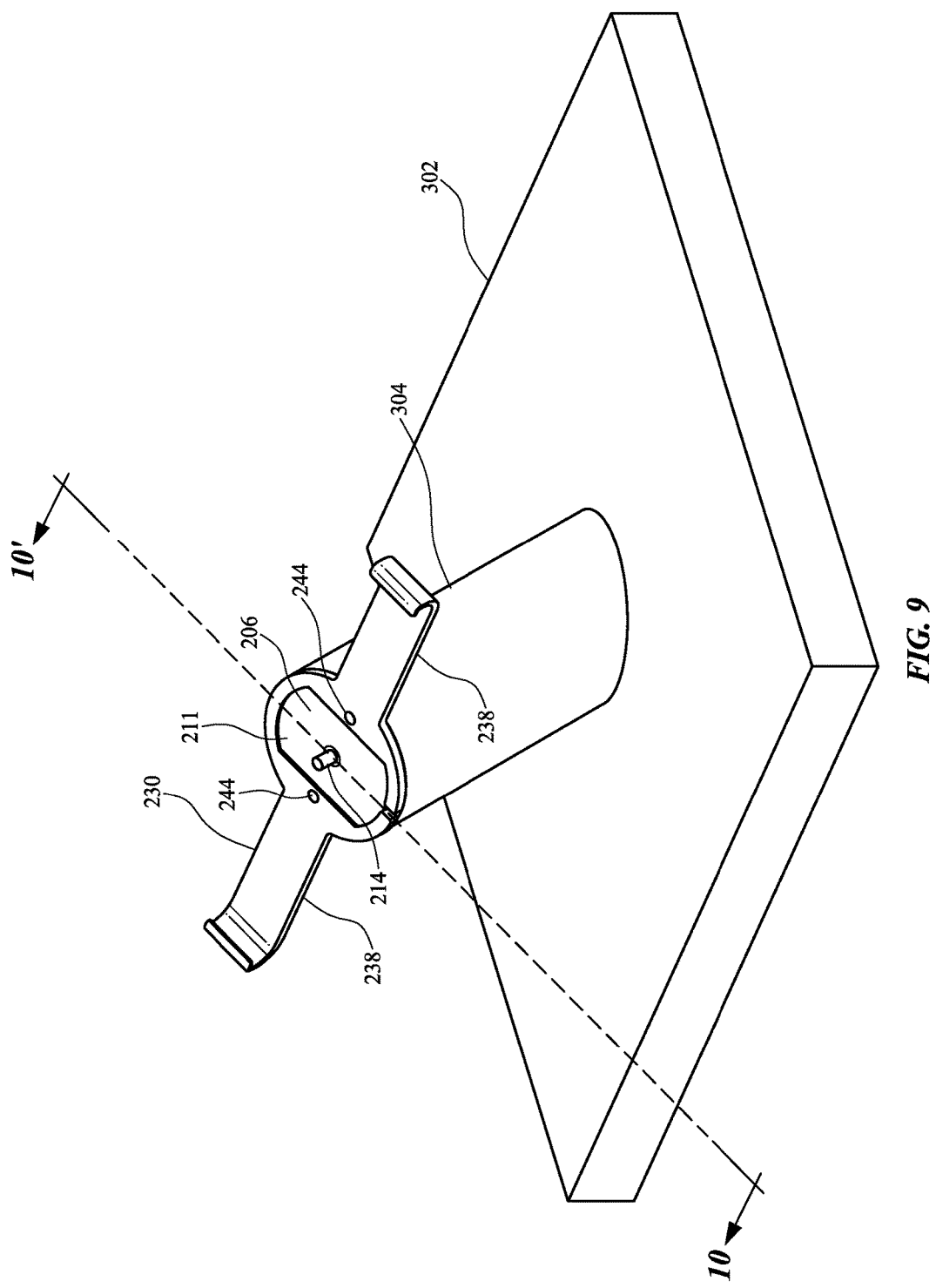
FIG. 9 shows an assembled display system according to an embodiment.
Figure 10:
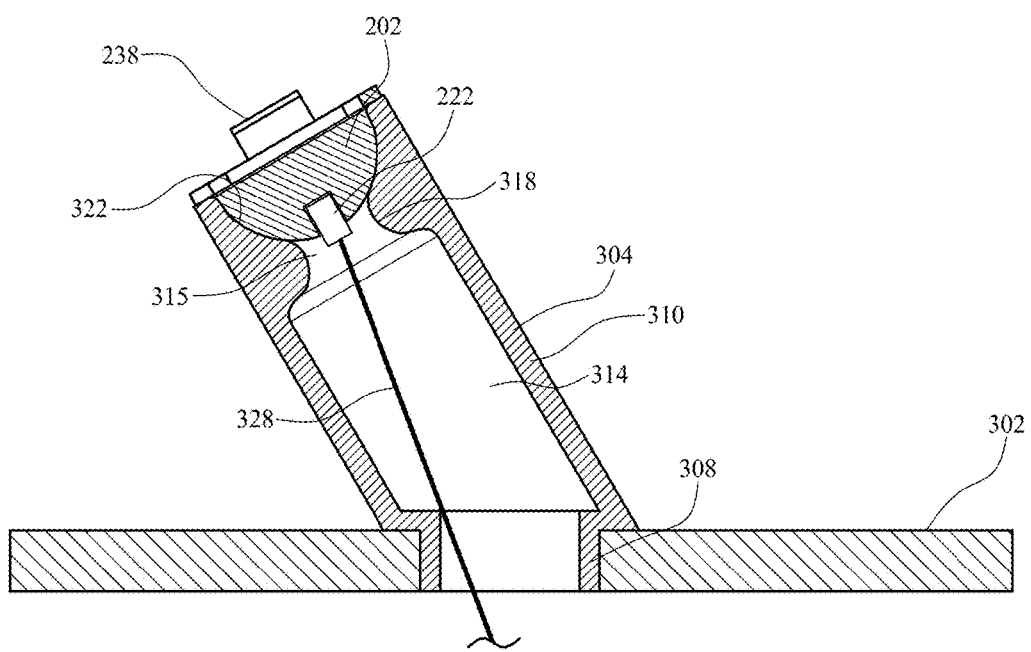
FIG. 10 shows a cross-sectional view of the display system shown in FIG. 9 along the line 10-10'.

Recess 320 may define a top opening 321 configured to receive retainer body 202 and bottom opening 323 that connects recess 320 to the rest of passage 314. Recess 320 includes an inner wall 322 that is shaped to receive at least a portion of retainer body 202, to thereby hide retainer body from view when it is received within recess 320. In some embodiments, recess 320 is shaped to receive the entire retainer body 202. In some embodiments, at least one second magnetic element, such as at least one second magnet 326, may be disposed adjacent to recess 320 in display stem 304. In some embodiments, a surface of at least one second magnet 326 forms a portion of inner wall 322. In some embodiments, a plurality (e.g., 2, 3, or 4) of second magnets 326 are disposed around passage 314. In some embodiments, the plurality of second magnets 326 are equidistant from each other about passage 314. Second magnets 326 may be positioned to interact with first magnets 228 when retainer body 202 is received within recess 320. To facilitate such interaction recess 320 and retainer body 202 may have mating shapes, so that their surfaces (and magnets) are in close proximity when they are engaged together. For example, as shown in FIGS. 1, 8, and 10, retainer body 202 may have a positive shape and recess 320 may have a negative shape that mates together with the positive shape. In some embodiments, the positive and negative shapes are positive and negative hemispherical shapes. First magnets 228 of retainer body 202 may cause retainer body 202 to rotate so that first magnets 228 are as close as possible to second magnets 326 of display stem 304, due to magnetic attraction between the magnets. This interaction between first magnets 228 and second magnets 326 serves to automatically orient retainer 200 (and retained product 102) when it is received within recess 320 of display stem 304.

While FIGS. 1-25 show display stem 304 having a recess 320 and retainer body 202 having a generally continuous convex curvature, recess 320 and retainer body 202 may have various shapes configured to interface with each other. For example, retainer body 202 may include a node that interfaces with recess 320. The node may be configured to move within recess 320. In some embodiments, at least a portion of the node is sized and dimensioned (shaped) to correspond with at least a portion of recess 320. The node and recess 320 may be the positive/negative of one another. In some embodiments, recess 320 may include a protrusion sized and dimensioned (shaped) to correspond with a recess located on retainer 200 (e.g., a recess formed in retainer body 202). In some embodiments recess 320 may be replaced with a protrusion sized and dimensioned (shaped) to correspond with a recess formed in retainer body 202. Recess 320 and retainer body 202 may include any suitable corresponding sizes and shapes. In some embodiments, recess 320 and retainer body 202 may have corresponding tapered shapes. In some embodiments, recess 320 and retainer body 202 may have corresponding rounded shapes including, but not limited to, cylindrical shapes, sloping cylindrical shapes, egg shapes, and hemispherical shapes.

In some embodiments retaining cable 328 extends through passage 314 of display stem 304. Passing retaining cable 328 through passage 314 helps hide it from view and makes it less susceptible to tangling or damage. One end 329 of retaining cable 328 is connected to retainer body 202 and the other end is connected to an anchor 330. Retaining cable 328 may also be connected to a power/data source 332. Power/data source 332 is configured to supply power and/or data to product 102 when product 102 is fixed to retainer 200. For example, power and/or data may be transmitted through retainer body 202 to an auxiliary cable 402 (see FIG. 4) that connects to a power and/or data port on product 102.

Anchor 330 may include or be a retraction mechanism 334 (see FIG. 2). Retraction mechanism 334 may be configured to apply tension to retaining cable 328 to pull retainer 200 towards retraction mechanism 334 when the applied tension is not overcome by another force on retainer 200 (e.g., by a person handling retained product 102). In some embodiments, retraction mechanism 334 may include, for example, a spring-loaded pulley, a counterweight, or any other suitable means for retracting a cable. Retraction mechanism 334, via retaining cable 328, holds retainer 200 against proximal end 312 of display stem 304 when retainer body 202 is received in recess 320 (see, e.g., FIGS. 9 and 10). When a user picks up product 102, this action applies enough force to overcome the tension applied by retraction mechanism 334, allowing retaining cable 328 to be drawn out through passage 314. In some embodiments, the length of cable 328 that can be drawn out is limited, thereby limiting the distance that retainer 200 and retained product 102 can be taken from support system 300. This can prevent retaining cable 328 from being completely removed from support system 300. In some embodiments, the length of cable 328 that can be drawn out is limited to a predefined length. In this way display system can be used to provide varying levels of security.

For example, in some embodiments, the predetermined length of retaining cable 328 that can be drawn out may be zero such that retaining cable 328 holds retainer 200 against proximal end 312 (e.g., such that retainer body 202 of retainer 200 cannot be removed from recess 320 of display stem 304). In effect, the retaining cable 328 cannot be drawn out in this configuration. Such a configuration prevents a customer from picking up product 102, but increases the difficulty of stealing product 102. If product 102 cannot be removed from display stem 304, a potential thief cannot rely on a played-out length of retaining cable 328 to provide leverage to separate product 102 from retainer 200 and/or support system 300 (e.g., by wrapping the cable around his arm and applying a sudden force).

In another embodiment, the predetermined length of retaining cable 328 that can be drawn out may be an intermediate length, such as, for example, a length that allows a user to pull out at most 6 inches of retaining cable 328. Such a length allows a customer to pick up product 102 and inspect it. This allows potential purchasers to more thoroughly inspect product 102, while still restricting the amount of leverage a potential thief has for separating product 102 from retainer 200 and/or support system 300.

In another embodiment, the predetermined length of retaining cable 328 that can be drawn out may be a long length, such as, for example, 1 meter. Such a length provides a potential customer with the most freedom in testing the product, but can provide a potential thief with a greater amount of leverage compared to the short and intermediate lengths.

The short, intermediate, and long predetermined lengths for retaining cable 328 can be selected for use by a retailer depending on the situation in which display system 100 is to be used. For example, the retailer may select different lengths depending on the perceived security risk (e.g., long for low-risk, intermediate for medium-risk, and short for high-risk), the product 102 being displayed (e.g., intermediate for a tablet computer since tablet computers are often operated at arm's length, or long for a smartphone, since smartphones are often operated closer to a user's head), or some combination of these and/or other considerations. Any of these or other cases can be accommodated simply by changing the predefined length of retaining cable 328 that can be drawn out. Thus, display system 100 can provide a single display solution across a wide range of a retailer's different products and security risks.

Figure 3:
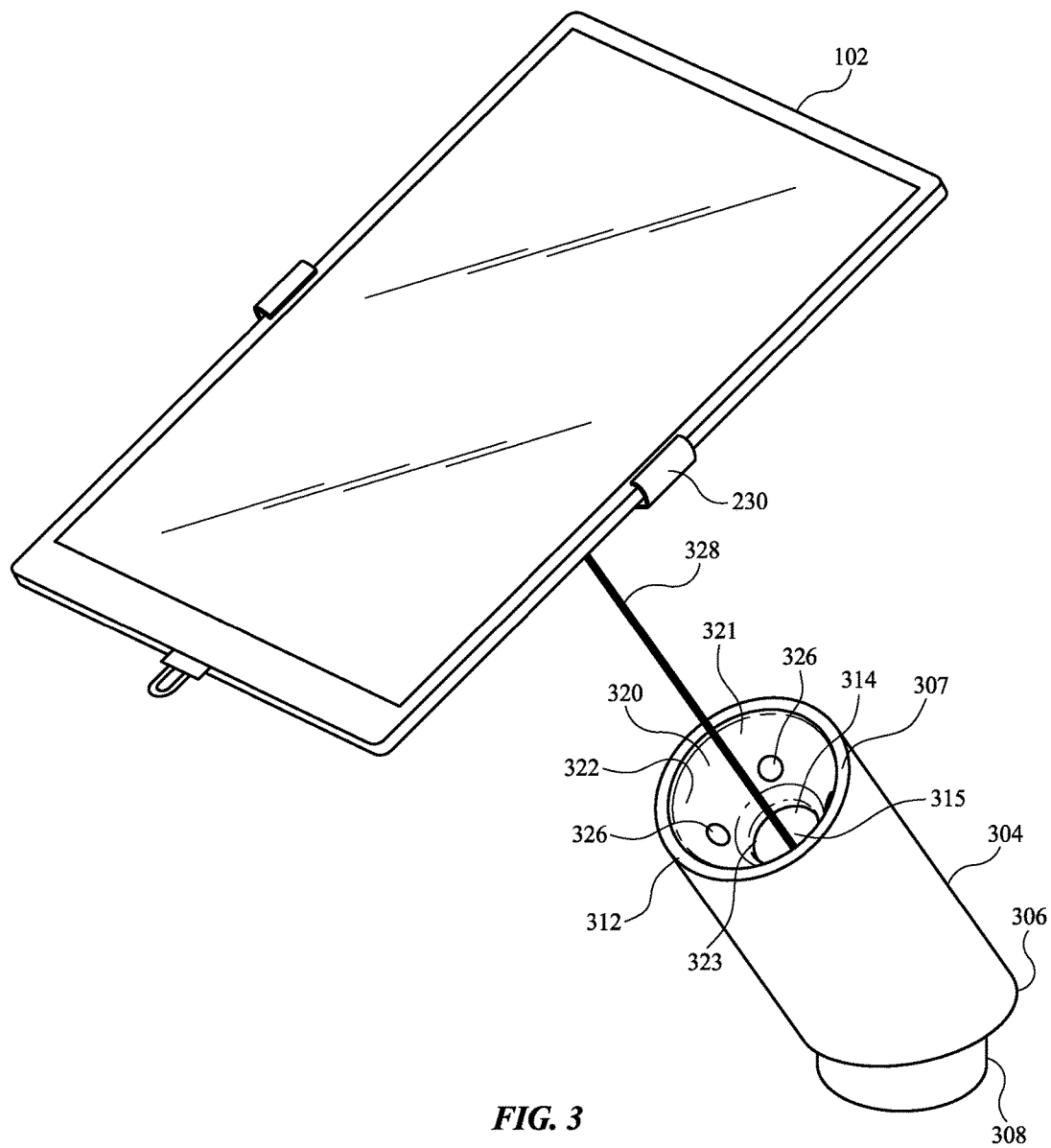
FIG. 3 shows a perspective view of a display system according to an embodiment.

A perspective view of a display stem 304 according to an embodiment is shown in FIG. 3. Recess 320, located at proximal end 312, includes an inner wall 322 having a hemispherical shape with an opening leading to throat area 315. While inner wall 322 is shown having a hemispherical shape in FIG. 3, recess 320 may have a different shape in other embodiments, including but not limited to an elliptical shape, a conical shape, an egg shape, or a cylindrical shape. In some embodiments the shape of recess 320 corresponds with the shape of outer surface 218 of retainer body 202. In some embodiments, a majority of the shape of recess 320 conforms exactly to the shape of outer surface 218. The correspondence in hemispherical shape between recess 320 and retainer body 202 of some embodiments helps retainer 200 freely rotate on display stem 304. This free rotation can help alignment mechanism (e.g., magnets as described) rotate retainer 200 to an indexed location with minimal interference from mating surfaces of retainer body 202 and recess 320. Since it is a generally smooth curve, the hemispherical shape of retainer body 202 also helps minimize the potential for retainer body to catch on edges of display stem 304 as it is drawn toward (e.g., by retraction mechanism 334) and enters recess 320

As shown in FIG. 3, inner wall 322 includes a plurality of second magnets 326. Second magnets 326 are disposed in cavities 324 of display stem 304 (see FIGS. 7 and 8) and define a portion of inner wall 322. Second magnets 326 may alternatively be disposed below inner wall 322.

FIG. 3 also shows passage 314 having a circular cross section. In other embodiments passage 314 may have a different cross-sectional shape, including but not limited to elliptical or polygonal. In some embodiments, display stem wall 310 is a single monolithic piece (see, e.g., FIGS. 2, 8, and 10). In some embodiments, display stem wall 310 is made of aluminum. In some embodiments, the surface of display stem wall 310 is finished using blasting (e.g., sand blasting) and anodization.

Figure 4:
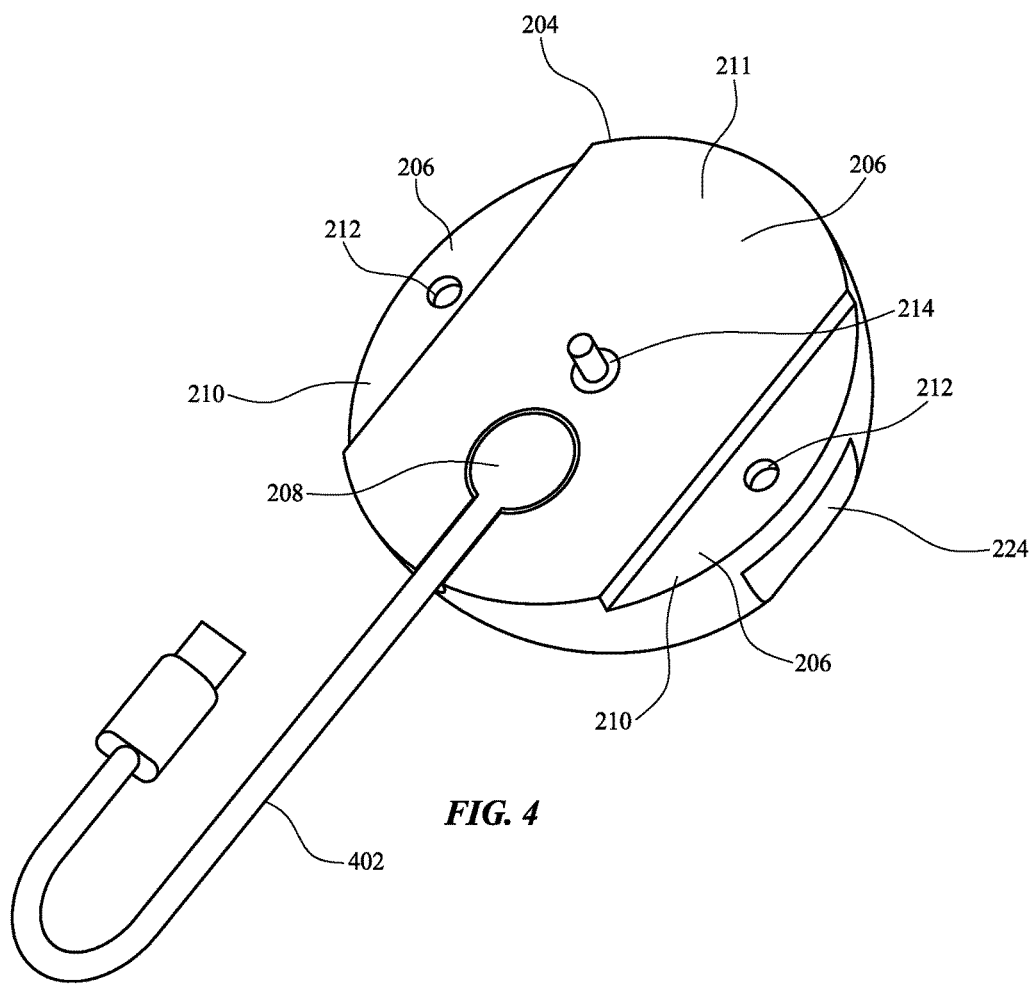
FIG. 4 shows a first perspective view of a retainer according to an embodiment.
Figure 5:
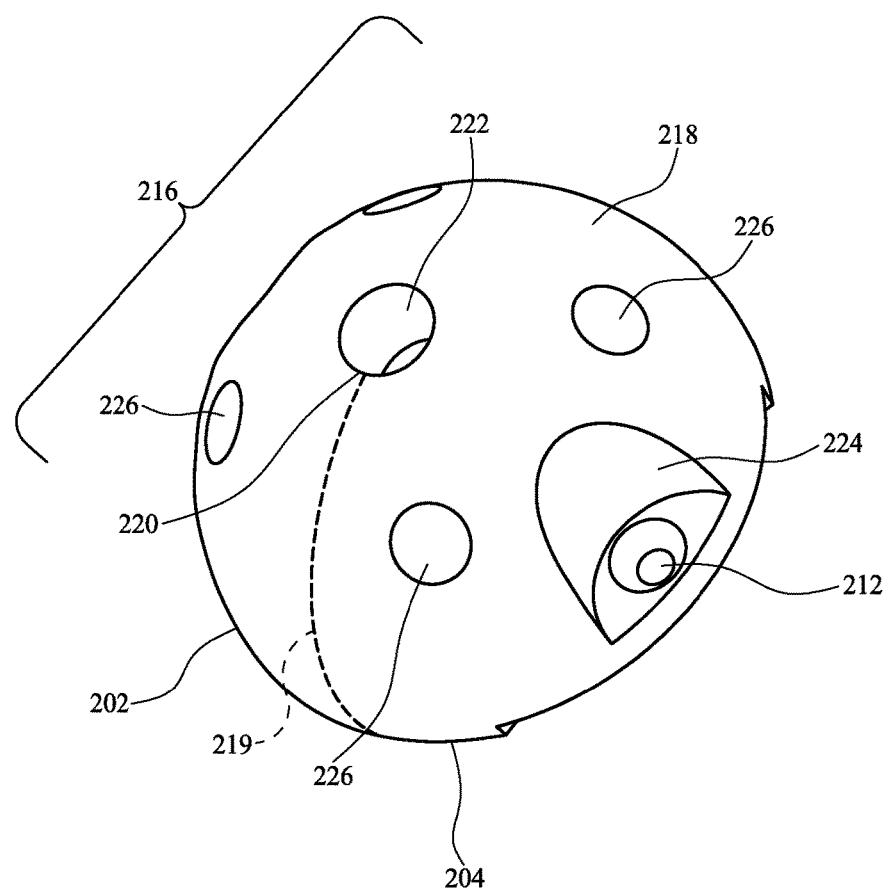
FIG. 5 shows a second perspective view of a retainer according to an embodiment.

A retainer body 202 according to an embodiment is shown in FIGS. 4 and 5. FIG. 4 shows base area 204 including fixing surface 206 according to one embodiment. Fixing surface 206 has a depressed area 210 and a protruded area 211 for together receiving a portion of bracket 230 and non-rotationally securing bracket 230 to retainer body 202 (see FIG. 9). Fixing surface 206 may define one or more holes 212 configured to accept a fastening mechanism (e.g., screws, bolts, pins, rivets, detents) that secure retainer body 202 to bracket 230. Holes 212 may be threaded or non-threaded. Alternatively or additionally, retainer body 202 may be fastened to bracket 230 using other fastening mechanisms such as, for example, adhesives or welding.

In some embodiments, fixing surface 206 includes a cable access 208, which may provide access for an auxiliary cable 402, which may be a data/power cable or other linkage, and which may connect to a port on product 102 to provide data and/or power to product 102. In some embodiments, data and/or power can be provided to cable access 208 through retaining cable 328, which may receive such data and/or power from power/data source 332 (see FIG. 2). Cable access 208 may be a cable pass-through through which the power/data cable can pass, or may be an outlet configured to receive a data/power cable plug from, e.g., auxiliary cable 402. The interior of retainer body 202 may include circuitry and/or electronics for delivering power and/or data to auxiliary cable 402. In this way, product 102 can receive power and/or data by being connected to auxiliary cable 402, which, in the case of an electronic device, may facilitate its operation and testing by a potential purchaser. In some embodiments, retainer body 202 is a single monolithic piece. In some embodiments, retainer body 202 may include multiple pieces (e.g., as discussed below in reference to FIG. 12).

Any suitable outlet and plug combination can be used at either end of auxiliary cable 402 to provide such power and/or data transmission through cable access 208 to product 102, such as, for example, Universal Serial Bus (USB), micro-USB, mini-USB, Advanced Technology Attachment (ATA) (e.g., Parallel ATA, Serial ATA), or any other standard or proprietary connection format. In some embodiments, cable access 208 can be coupled to a cable (e.g., a data and/or power cable) running through or itself forming retaining cable 328.

In some embodiments, fixing surface 206 includes security switch 214. Security switch 214 may be communicatively coupled to an alarm or other alert such that the alert can be triggered by removal of product 102 from retainer 200. Such removal of product 102 from retainer 200 may disengage (or engage) security switch 214, thereby triggering the alert.

FIG. 5 shows a perspective view of an underside 216 of retainer body 202 according to an embodiment. Underside 216 is defined by a substantially smooth curved outer surface 218. In some embodiments, underside 216 includes at least one slot 224 to provide access to holes 212. In some embodiments, underside 216 defines an opening forming coupling element 222 to connect to a proximal portion of retaining cable 328. Coupling element 222 may be configured to receive and secure one end 329 of retaining cable 328 to retainer body 202 as discussed above in reference to FIG. 2. In some embodiments, underside 216 defines cavities 226 disposed around coupling element 222 for receiving first magnets 228. In some embodiments, when first magnets 228 are present in cavities 226 their outer surfaces align with a portion of outer surface 218. In some embodiments, first magnets 228 may alternatively be disposed below outer surface 218 (e.g., embedded within retainer body 202).

In some embodiments, underside 216 of retainer body 202 has a substantially smooth shape defined by substantially smooth curved outer surface 218. In other words, in some embodiments outer surface 218 defines a continuous curvature where interruptions are due only to recesses or openings to accommodate magnets or fastening elements, as described above (e.g., first magnets 228, slots 224, and coupling element 222). In some embodiments, the continuous curvature of outer surface 218 curves in only one direction (i.e., it does not have curves with different directions of inflection). For example, as shown in FIG. 5, underside 216 is a hemisphere (i.e., it has a hemispherical outer surface 218). In some embodiments, outer surface 218 includes a portion extending from peak area 220 to base area 204 that is completely smooth, containing no interruptions from surface features (see, e.g., path 219 in FIG. 5). In some embodiments, at least a portion of outer surface 218 has a continuous and non-zero slope extending from peak area 220 to base area 204 (see, e.g., path 219 in FIG. 5). In some embodiments, outer surface 218 has a continuously increasing slope extending from peak area 220 to base area 204 (see, e.g., path 219 in FIG. 5). In some embodiments, outer surface 218 has a slope with a constant curvature extending from peak area 220 to base area 204 (see, e.g., path 219 in FIG. 5). In some embodiments, underside 216 may have a shape other than a hemisphere, such as, for example, an elliptical or frustoconical shape.

As shown in FIG. 5, peak area 220 is the point or area on outer surface 218 that is farthest way from base area 204 in a direction orthogonal to at least a portion of fixing surface 206. For example, in FIG. 5 peak area 220 is the perimeter around coupling element 222. Base area 204 is immediately adjacent bracket 230.

The shape of outer surface 218 allows retainer body 202 to easily slide out of recess 320 when product 102 is picked up by a user and to easily slide into recess 320 when a user places retainer 200 onto display stem 304 or retaining cable 328 is retracted by retraction mechanism 334. The smooth curved outer surface 218 reduces friction and the potential for retainer body 202 to become caught on rim a 307 of display stem 304 (thereby not seating properly within recess 320). This can also reduce the potential for damage to retainer 200 and display stem 304, when engaging or disengaging retainer 200 and display stem 304. Additionally, it ensures that retainer body 202 always fits into recess 320 no matter its orientation.

In combination with refraction mechanism 334, which pulls retainer 200 and retained product 102 toward display stem 304 when no outside force overcomes the tension that retraction mechanism 334 applies to retaining cable 328 (e.g., when retained product 102 is released by a handler), the shape of outer surface 218 and ensures that product 102 automatically re-seats itself into recess 320 under tension of retaining cable 328, in order to repeatably be displayed in a predefined position without requiring external interaction by a handler of product 102. The hemispherical shape of outer surface 218 is well-suited to achieve these ends due at least in part to its lack of protrusions or corners around its side surfaces, so that its side surfaces slide over rim 307 without interruption under power of the tension provided by retraction mechanism 334. Hemispherical outer surface 218 can thereby be pulled completely within recess 320, thereby re-seating itself and hiding itself from view.

Furthermore, in some embodiments being seated in recess 320 brings first magnets 228 and second magnets 326 in close enough proximity that they can magnetically interact with each other to both retain retainer body 202 within recess 320 and rotate retainer 200 and retained product 102 relative to display stem 304 so that retained product 102 is oriented in a predefined position, as described elsewhere herein. The hemispherical shape of outer surface 218 is well-suited to achieve these ends due at least in part to its lack or protrusions or corners around its side surfaces, which allow it to rotate within recess 320.

Figure 6:
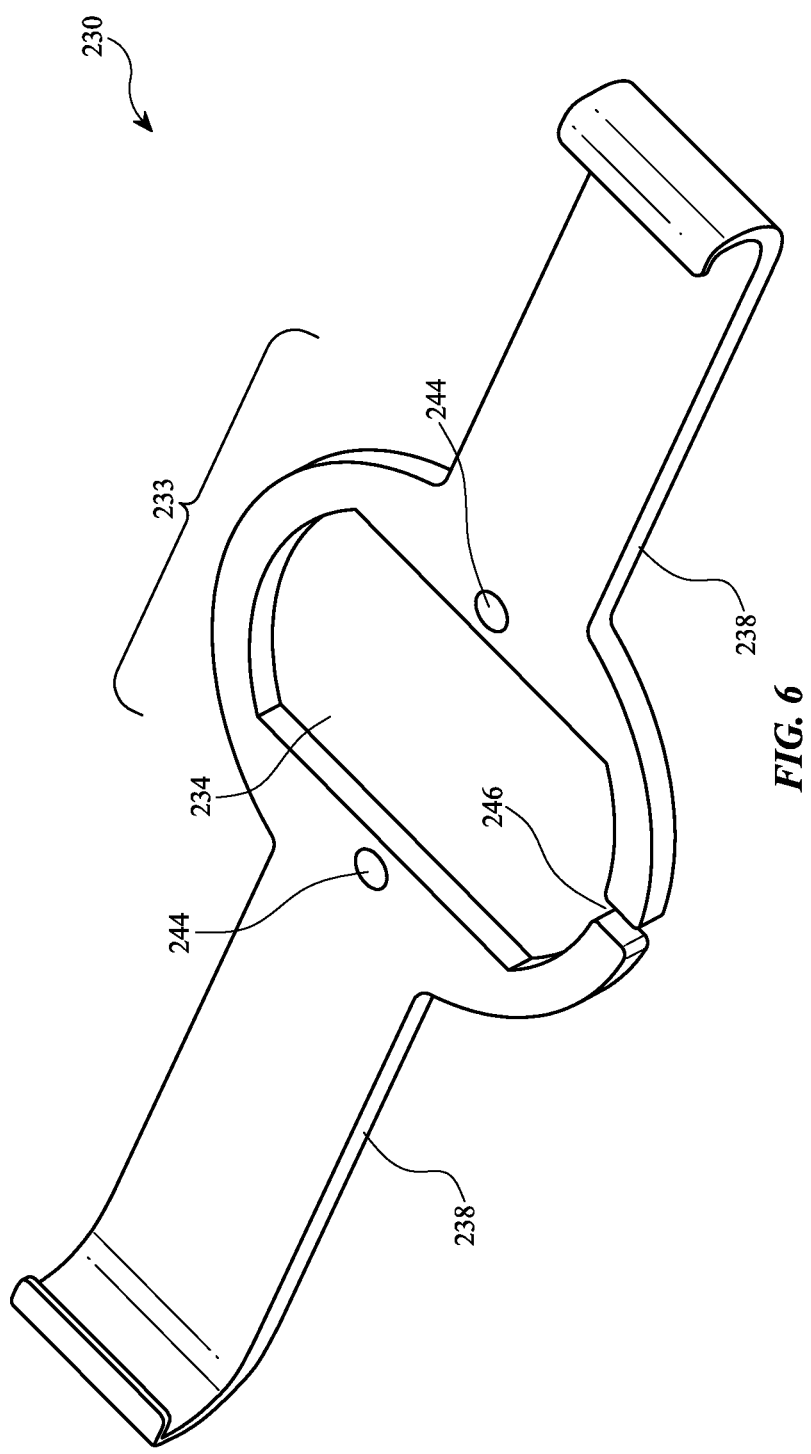
FIG. 6 shows a perspective view of a bracket according to an embodiment.
Figure 7:
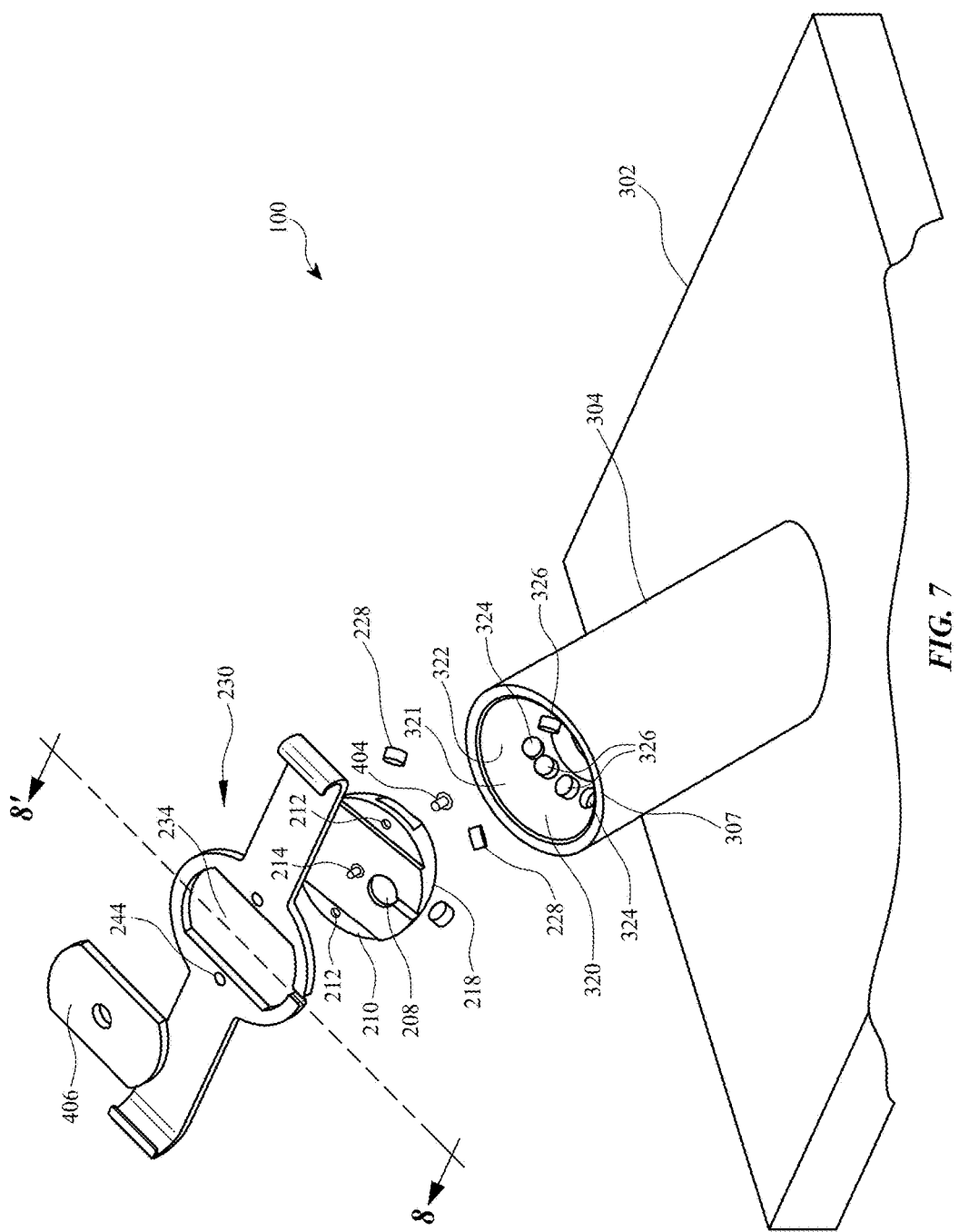
FIG. 7 shows an exploded view of a display system according to an embodiment.

A bracket 230 according to an embodiment is shown in FIG. 6. In some embodiments, bracket 230 includes a center portion 233 and two bracket arms 238. Bracket arms 238 extend to and around opposing sides of retained product 102, to thereby fix product to retainer 200 and to prevent its removal therefrom. While FIG. 6 shows two bracket arms 238, in some embodiments bracket 230 may include any number of bracket arms, for example, four bracket arms.

Since bracket arms 238 only extend a short distance over the front surface of retained product 102 (e.g., just enough to securely retain product 102) and are limited to discrete positions centrally-located and occupying a small proportion of the length of product 102, they are able to retain product 102 without covering a display screen or other operative feature of product 102, to thereby present product 102 to a potential purchaser with minimal visual impact so that the potential purchaser can inspect product 102 with minimal distraction from display system 100. In some embodiments, bracket arms 238 may alternatively or additionally include other fixing elements such as, for example, screws, snaps, rivets, buckles, detents, bolts, press fit, or adhesive (e.g., glue, epoxy, adhesive tape) to couple product 102 to retainer 200.

In some embodiments, center portion 233 defines a central opening 234, which may mate with fixing surface 206 on retainer body 202. For example, a perimeter of protruded area 211 may correspond to a perimeter of central opening 234 such that protruded area 211 occupies central opening 234 when bracket 230 is mated with retainer body 202.

In some embodiments, center portion 233 also defines holes 244 configured to align with holes 212 of retainer body 202. In some embodiments, center portion 233 also includes a cable aperture 246 configured to align with cable access 208 for receiving and allowing auxiliary cable 402 to pass from within to without central opening 234. In some embodiments, bracket 230 is formed of a single piece (see, e.g., FIG. 6). For example, bracket 230 may be formed of a single extruded piece that is machined into its final shape.

In some embodiments, bracket 230 is formed of two pieces (e.g., a first piece 290 and a second piece 294, as discussed below in regards to FIGS. 17-19). A two-piece bracket 230 may increase the modularity of retainer 200. For example, pieces 290 and 294 may be individually replaced in the event that one of them is damaged. Additionally, a two-piece bracket 230 may increase the ease of assembling retainer 200 and attaching product 102 to retainer 200 since the pieces can move relative to one another, e.g., to receive product 102 between portions of bracket 230.

In some embodiments, bracket 230 has a thickness of approximately 3 mm, which provides a minimal visual impact while still providing sufficient strength to securely retain product 102. In other embodiments, however, bracket 230 may have greater or lesser thickness. In some embodiments, bracket 230 is made out of aluminum, for example, 6063 aluminum alloy. In some embodiments, the surface of bracket 230 is finished using blasting (e.g., sand blasting) and anodization.

In some embodiments, a fixing element 406 (see FIGS. 7 and 8) may be provided on retainer body 202, disposed on fixing surface 206 to contribute to retention of product 102 on retainer 200. Fixing element 406 may be disposed on protruded area 211 in order to come into contact with product 102. For example, fixing element 406 may be an adhesive, such as, for example, glue, epoxy, or adhesive tape (e.g., a double coated acrylic foam tape). In some embodiments, fixing element 406 may alternatively or additionally be a mechanical fastener such as, for example, a screw, snap, rivet, buckle, detent, bolt, or press fit.

The engagement between retainer body 202 and bracket 230 as well as the operation of display system 100 will be further described with reference to FIGS. 7-10. Fixing surface 206 having depressed areas 210 and protruded area 211 on retainer body 202 mates with center portion 233 of bracket 230 such that part of fixing surface 206 extends into center portion 233 (see FIG. 9). The mating configuration between fixing surface 206 and center portion 233 does not define a circular shape, to ensure that retainer body 202 and bracket 230 cannot rotate relative to each other, thereby increasing the strength of retainer 200 and ensuring repeatability in orientation relative to display stem 304. Furthermore, the mating ensures that holes 212 and 244 on retainer body 202 and bracket 230, respectively, are aligned, and prevents shear stress from being placed on fasteners 404 occupying holes 212 and 244.

Fasteners 404 (e.g., screws, bolts, pins, rivets, see FIG. 7) are inserted within aligned holes 212 and 244 to secure retainer body 202 to bracket 230. In some embodiments holes 212 and 244 are oriented in a direction parallel to the axis of rotation 502 of retainer 200 (which may coincide with the center axis of retainer body 202). Axis of rotation 502 of retainer 200 is the axis extending through the center of retainer body 202 at a direction orthogonal to fixing surface 206 (see FIG. 8). This orientation provides optimal strength for the connection between retainer body 202 and bracket 230 since shear stress is not placed on fasteners 404 in the event a thief attempts to pull product 102 off of retainer 200, and so the chances of failure of fasteners 404 are reduced. In some embodiments, fasteners 404 may be held within retainer body 202 such that they cannot fall out of retainer body 202 and cannot be removed by a user (e.g., a retail store owner).

As discussed elsewhere herein, in some embodiments retaining cable 328 and magnets 228 and 326 may be used to hold retainer 200 on proximal end 312 of display stem 304. When retainer 200 is placed onto or retracted by retraction mechanism 334 onto proximal end 312, retainer body 202 fits into recess 320 and magnetic forces between first magnets 228 and second magnets 326 automatically orient retainer body 202 within recess 320. The interaction between first magnets 228, second magnets 326, retraction mechanism 334 and retaining cable 328, outer surface 218, and recess 320 ensures that product 102 is always returned to and displayed in its predetermined position and orientation, to help a retailer ensure its display in an aesthetically appealing position.

To apply magnetic attractive forces both axially along axis 502 (to help draw and retain retainer body 202 within recess 320) and orthogonally to axis 502 (to help rotate retainer 200 with respect to display stem 304), magnets 228 and 326 may be oriented to direct their magnetic fields obliquely with respect to axis 502, such that their attractive forces apply at least a component force parallel to axis 502 and a component orthogonal to axis 502. Further, first magnets 228 may be positioned such that they are disposed in an oblique direction from second magnets 326 with respect to axis 502. In some embodiments, this oblique direction is oriented such that a line through the oblique direction (e.g., line 504 in FIG. 8) would intersect axis 502.

Substantially smooth outer surface 218 ensures that retainer body always slides into, i.e., self-locates in, recess 320 under the tension applied by refraction mechanism 334 through retaining cable 328, thereby ensuring that product 102 is always displayed in a desired position (e.g., facing potential purchasers) and is not displayed in an off-kilter or dangling position. In some embodiments the size and shape of retainer body 202 is such that recess 320 receives the entire retainer body 202 (see FIG. 10). This results in a low-profile appearance that may be more aesthetically appealing to potential customers. In some embodiments, however, recess 320 only receives a portion of retainer body 202.

Figure 26:
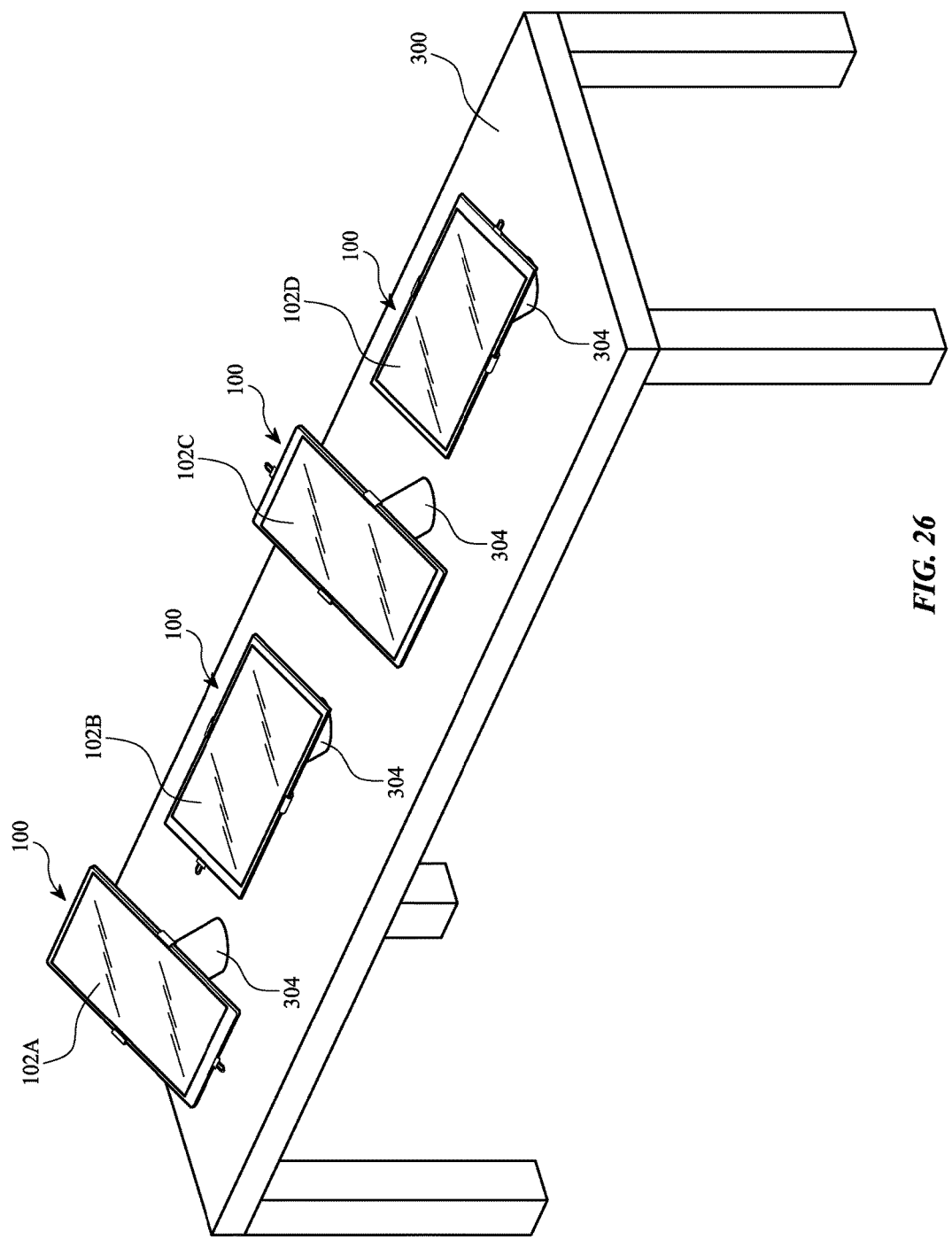
FIG. 26 shows display systems holding multiple products according to an embodiment.

Once retainer body 202 slides into recess 320, first magnets 228 and second magnets 326 serve to automatically orient retainer 200 into desired positions. For example, display system 100 could employ four first magnets 228 and four second magnets 326, which automatically rotate retainer 200 to be oriented into one of four positions, each separated by 90° (e.g., promoting orientation at 0°, 90°, 180°, 270°). Such a configuration ensures that product 102 always returns to a vertical or horizontal orientation, which may be more aesthetically appealing to potential purchasers. For example, FIG. 26 shows product 102 oriented at 0°, 90°, 180°, and 270° (products 102A, 102B, 102C, 102D, respectively).

For embodiments having any or no length of cable 328 that can be drawn out, substantially smooth outer surface 218 and magnets 228 and 326 allow smooth rotation of product 102 between predefined desired rotational positions. In embodiments having intermediate or long length of cable 328 that can be drawn out, these features ensure that product 102 always returns to a predefined desired rotational position upon return to display stem 304. For example, when a user drops or releases product 102, retraction mechanism 334 retracts retaining cable 328 thereby pulling retainer body 202 into recess 320. Once in recess 320, magnets 228 and 326 automatically orient retainer body 202 and retained product 102 into a desired position.

While the above example describes four first magnets and four second magnets, any number of magnets may be used to automatically orient retainer body 202 in recess 320 at any desired angle (i.e. rotational orientation), and the number of first magnets 228 need not be the same as the number of second magnets 326. The orientation(s) of retainer body 202 may be based on the location and position of first magnets 228 and second magnets 326. In some embodiments, the orientations are radially separated by at least 90 degrees of rotation. In some embodiments, the orientations are radially separated by 90 degrees of rotation.

Magnets described herein (e.g., magnets 228 and 326) may include, but are not limited to, rare earth magnets, such as Neodymium magnets, or electromagnets. Magnets described herein (e.g., magnets 228 and 326) may be replaced with material that is attractive to magnets (e.g., ferromagnetic material or ferrimagnetic material). For example, where magnetic attraction is described above between two magnets, either one of the magnets in the pair may be replaced with a magnetically-attractive material; magnetic attraction will still exist therebetween. In some embodiments, first and second magnets may be cylindrical in shape, the cylinder having a diameter in the range of 3 mm to 3.5 mm and a length in the range of 2.5 mm to 3.5 mm. In some embodiments, retainer body 202 may include four first magnets 228 and recess 320 may include eight second magnets 326 as described below in reference to FIGS. 20-23.

In embodiments where magnets described herein (e.g., magnets 228 and 326) are electromagnets, such electromagnets may be activated intermittently (e.g., only when used to retain and/or effect rotation of retainer 200). For example, electromagnetic magnets 228 and 326 may only activate when retainer body 202 is received within recess 320. In some embodiments, electromagnetic magnets 228 and 326 are only active long enough to rotate retainer 200 to one of the indexed locations. This can help conserve energy. The position of retainer 200 can be determined with sensors of display system 100 or with sensors of a displayed product 102 (e.g., proximity or light sensors, accelerometers).

In some embodiments, power may be delivered to product 102 through first magnets 228 and second magnets 326 by their contact or close proximity when retainer body 202 is received within recess 320. In some embodiments, circuitry and/or electronics within retainer body 202 may facilitate inductive ("wireless") charging of product 102 via magnets 228 and 326. In such cases, and where data does not need to be supplied to product 102, auxiliary cable 402 may not be used.

In some embodiments, power may be delivered to product 102 via charging contacts located on retainer 200 and charging contacts located in recess 320. In such embodiments, retainer body 202 may include circuitry and/or electronics for receiving electrical power from display stem 304 via charging contacts in recess 320 and, in turn, deliver the power to auxiliary cable 402 via charging contacts located on retainer body 202. In such embodiments, retaining cable 328 may not provide power to display system 100. Providing power via display stem 304, rather than retaining cable 328, may have various benefits. First, customers would not handle an electrified retaining cable 328 when inspecting product 102 fixed to retainer 200. Second, retaining cable 328 and/or retractor 330 engineering may be simplified. Third, power loss in retaining cable 328 may be avoided. Particularly, customer interaction with product 102 that may cause power in the retainer cable 328 to degrade over time (i.e., due to wear and tear on wires and electronics associated with retainer cable 328) can be avoided.

FIGS. 11-14 show a retainer body 202 having charging contact rings 250 and 252 according to some embodiments. Charging contact rings 250 and 252 may carry opposite electric charges (i.e., a positive and negative charge). Charging contact ring 250 may be a negative charging contact ring and charging contact ring 252 may be a positive charging contact ring, and vice versa. For purposes of the description herein, charging contact ring 250 will be referred to as negative charging contact ring 250 and charging contact ring 252 will be referred to as positive charging contact ring 252. In some embodiments, retainer body 202 may be made of an insulating material, such as a polymer or ceramic, for electrically isolating negative charging contact ring 250 and positive charging contact ring 252. In some embodiments, retainer body 202 may have insulating material located along the perimeter of negative charging contact ring 250 and positive charging contact ring 252 on outer surface 218 so as to electrically isolate the two rings (e.g., in embodiments where retainer body 202 may be made of an electrically conductive material).

Figure 11:
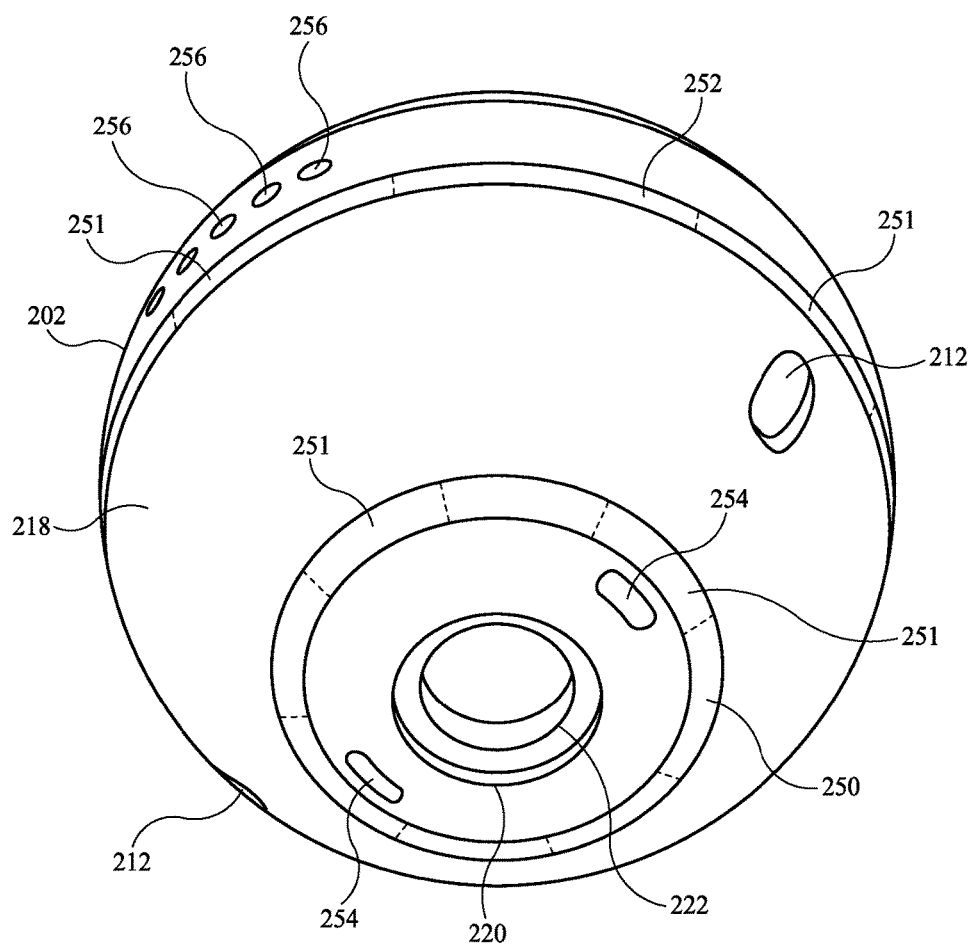
FIG. 11 shows a bottom perspective view of a retainer according to an embodiment.

As shown, for example in FIG. 11, in some embodiments, negative charging contact ring 250 and positive charging contact ring 252 may be disposed on outer surface 218 of retainer body 202, and in some embodiments, charging contact rings 250 and 252 may form a portion of outer surface 218. In some embodiments, charging contact rings 250 and 252 may be continuous rings extending around outer surface 218 of retainer body 202. In some embodiments, charging contact rings 250 and 252 are concentric rings extending around outer surface 218 of retainer body 202. In some embodiments, charging contact rings 250 and 252 may be discontinuous rings having gaps 251 located between discrete segments thereof. Gaps 251 may be formed by an insulating material. For example, gaps 251 may be formed, in whole or in part, by empty air space, by outer surface 218 or other portion of retainer body 202, and/or may be cavities filled with an insulating material.

FIG. 11 also shows retainer body 202 having indicators 256 for indicating that security switch 214 has been disengaged (or engaged) by the removal or product 102 and/or that retaining cable 328 has been severed. FIG. 11 also shows retainer body 202 having disconnect apertures 254 for releasing end 329 of retaining cable 328 from coupling element 222. In some embodiments, retainer body 202 may include two disconnect apertures 254 disposed radially about coupling element 222. In some embodiments, retainer body 202 may include more than two disconnect apertures 254. A tool 500 may be used to release retaining cable 328 as discussed below in reference to FIGS. 24 and 25.

Figure 12:
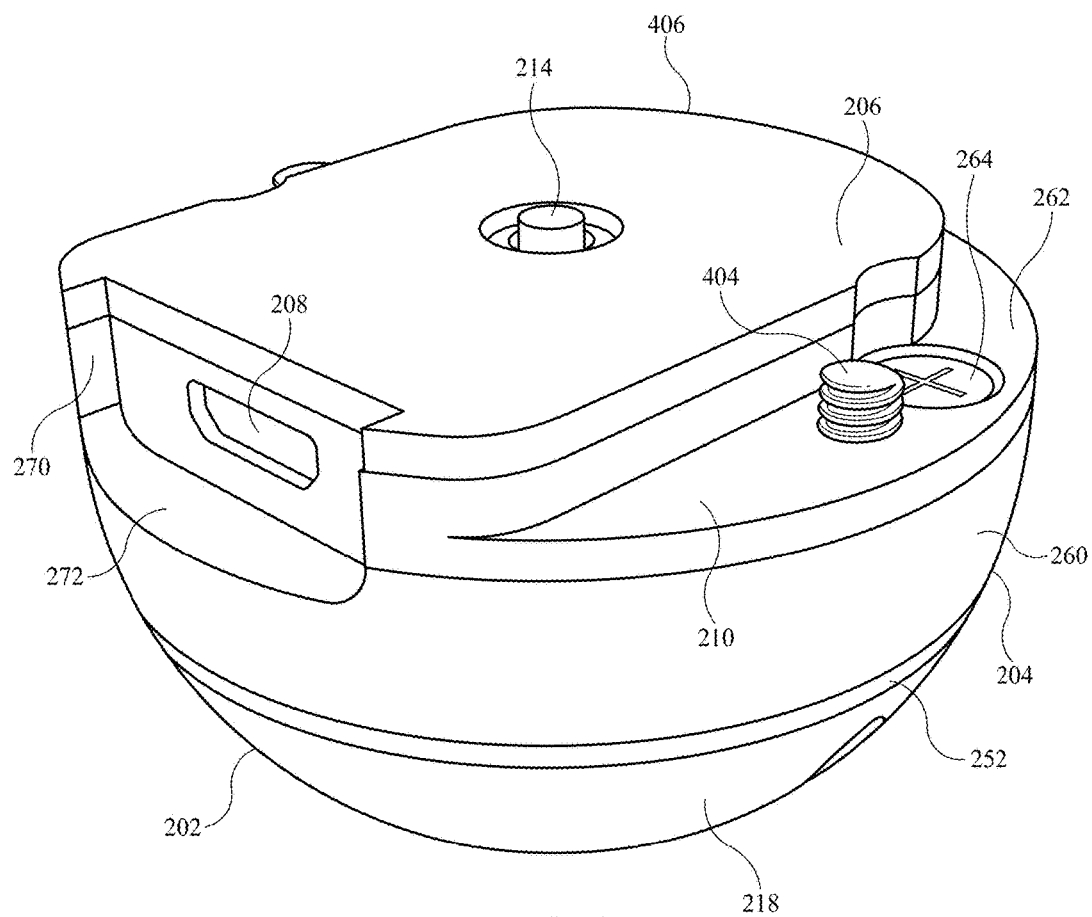
FIG. 12 shows a top perspective view of a retainer according to an embodiment.

As shown in FIG. 12, in some embodiments, retainer body 202 may include a multi-piece construction including a cup 260 and a cap 262. Cup 260 may be attached to cap 262 using, for example, fasteners 264. In some embodiments, fasteners 264 may be screws. Alternatively or additionally, cup 260 may be attached to cap 262 using adhesives or welding. A multi-piece retainer body 202 may facilitate assembly and configurability of retainer 200 and the repair and/or replacement of internal components of retainer body 202 (e.g., circuitry associated with charging contacts 250 and 252 or cable access 208).

In some embodiments, retainer body 202 may include a plug recess 270 inset from outer surface 218 for receiving at least a portion of auxiliary cable 402 attached to cable access 208. Plug recess 270 may include a sidewall 272 sized and shaped to receive a plug flange 410 located on a plug 408 of auxiliary cable 402 (see e.g., FIGS. 18 and 19).

Figure 13:
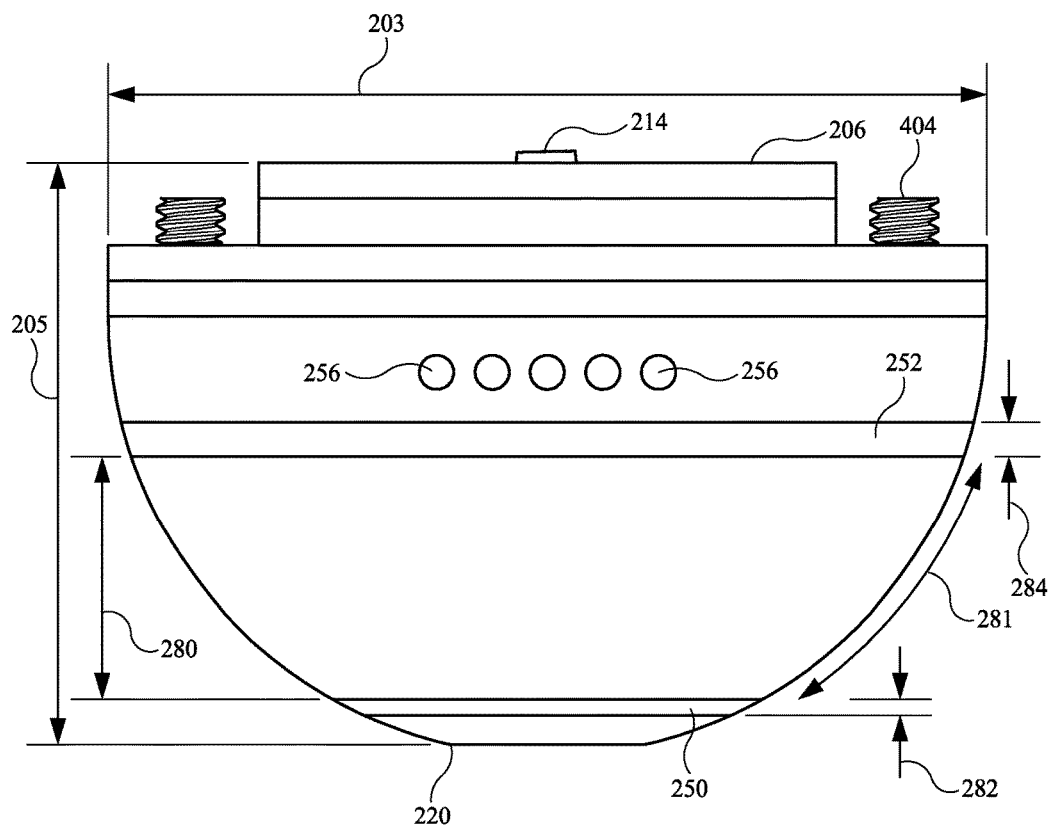
FIG. 13 shows a side view of a retainer according to an embodiment.

FIG. 13 shows a side view of retainer body 202 having negative charging contact ring 250 and positive charging contact ring 252 separated by a vertical distance 280. Vertical distance 280 may be based on the size and shape of retainer body 202. In some embodiments, vertical distance 280 may be in the range of 9 mm to 12 mm. In some embodiments, vertical distance 280 may be 10.5 mm. In some embodiments, vertical distance may be between 35% and 65% of an overall height 205 of retainer body 202. Charging contact rings 250 and 252 are also separated by a radial distance 281, based on the radius of curvature of the portion of outer surface 218 separating negative charging contact ring 250 and positive charging contact ring 252. In some embodiments, retainer body 202 may have a diameter 203 in the range of 35 mm to 40 mm. In some embodiments, diameter 203 may be 37 mm. In some embodiments, overall height 205 of retainer body 202 may be in the range of 20 mm to 30 mm. In some embodiments, overall height 205 may be 24.5 mm.

The width of charging contact rings 250 and 252, width 282 and width 284, respectively, may be based on the size and shape of retainer body 202. In some embodiments, widths 282 and 284 may be in the range of 1 mm to 2 mm measured along outer surface 218. In some embodiments, widths 282 and 284 may be 1.5 mm. In some embodiments, width 282 may be the same as width 284. In some embodiments, widths 282 and 284 may be different. The widths 282/284 of charging contacts rings 250/252 and the distances separating them (e.g., vertical distance 280 and radial distance 281 separating them) should be such that negative charging contact ring 250 and positive charging contact ring 252 are electrically isolated from each other on outer surface 218. In some embodiments, vertical distance 280 may be at least 5 times larger than width(s) 282/284. In some embodiments, vertical distance may be at least 10 times larger than width(s) 282/284.

Figure 14:
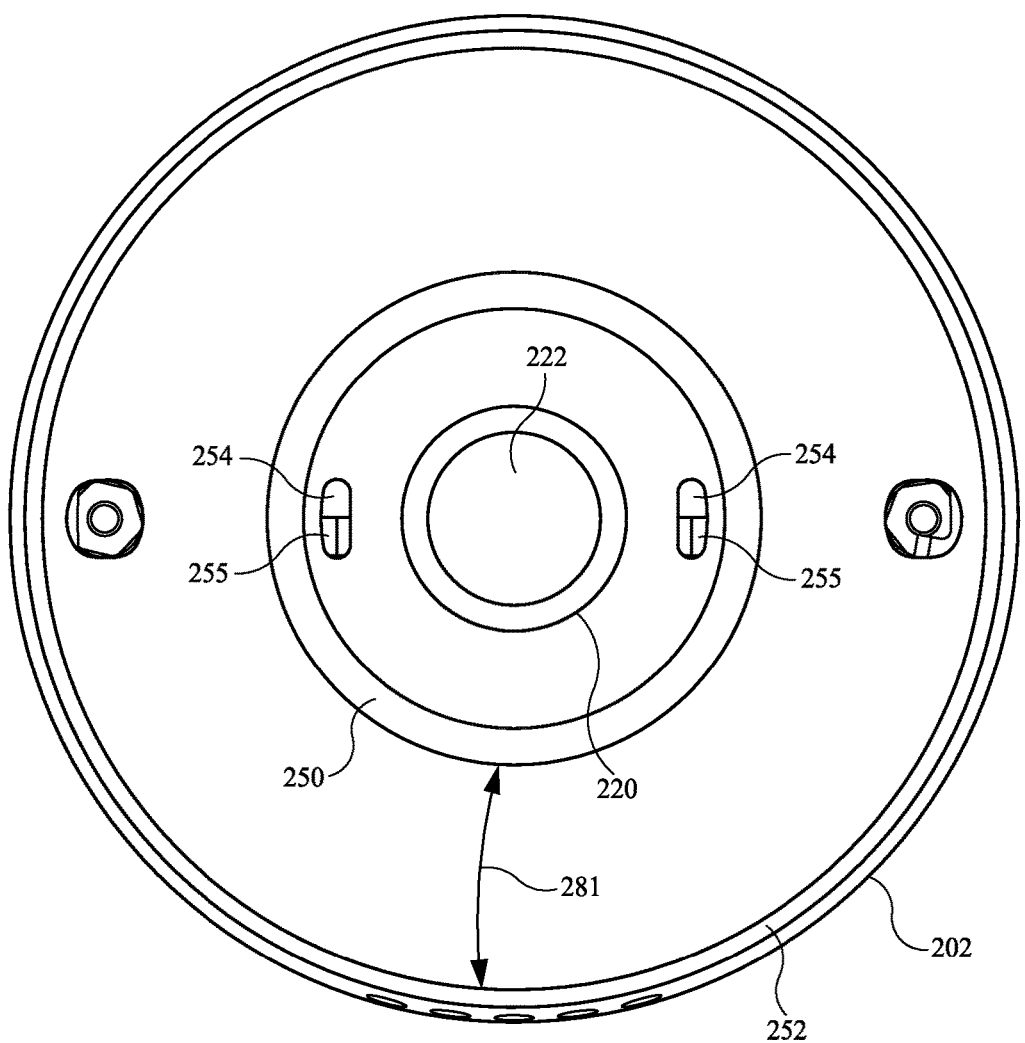
FIG. 14 shows a bottom view of a retainer according to an embodiment.

FIG. 14 shows a bottom view of retainer body 202 according to some embodiments in a direction orthogonal to peak area 220 and the connection between retainer cable 328 and retainer body 202 at coupling element 222 (i.e., a direction orthogonal to fixing surface 206). As shown in FIG. 14, negative charging contact ring 250 and positive charging contact ring 252 may be disposed radially about coupling element 222. In some embodiments, negative charging contact ring 250 and positive charging contact ring 252 are separated by a constant vertical and radial distance corresponding to vertical distance 280 and radial distance 281, respectively.

Figure 15:
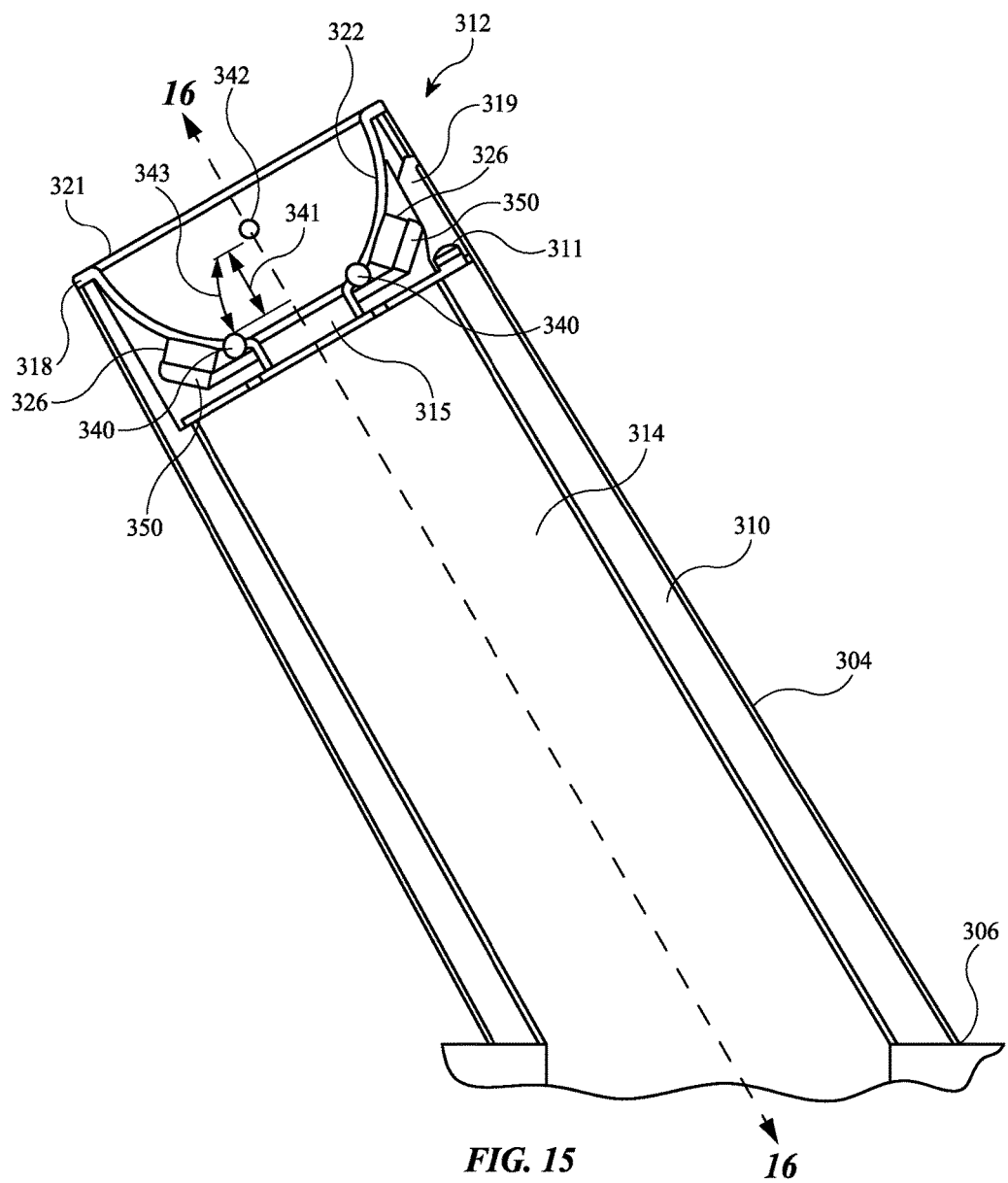
FIG. 15 shows a cross-sectional view of a display stem according to an embodiment.
Figure 16:
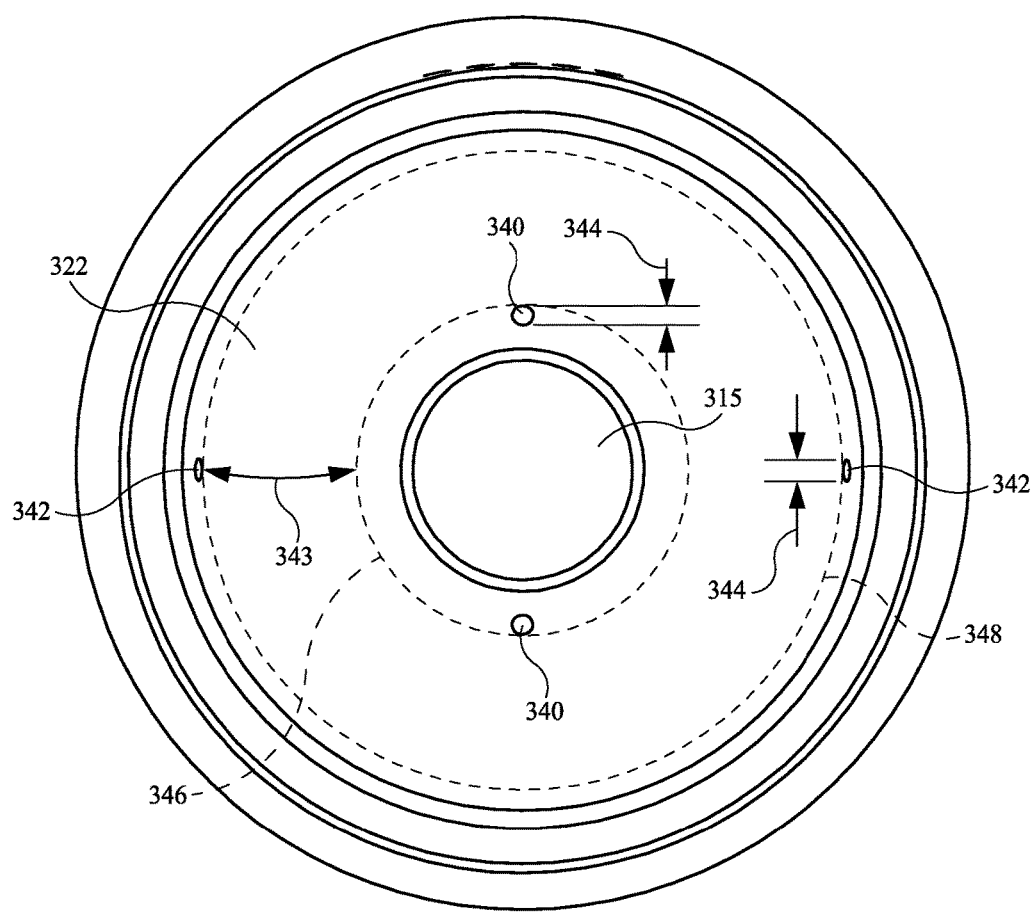
FIG. 16 shows a view of the display stem taken from the perspective of arrow 16 of FIG. 15.

FIGS. 15 and 16 show a display stem 304 having charging contacts 340 and 342 for electrically engaging charging contact rings 250 and 252, respectively. Charging contacts 340 and 342 may carry opposite electric charges (i.e., a positive and negative charge). Charging contacts 340 may be negative charging contacts and charging contacts 342 may be positive charging contacts, and vice versa. For purposes of the description herein, charging contacts 340 will be referred to as negative charging contacts 340 and charging contacts 342 will be referred to as positive charging contacts 342. In some embodiments, recess 320 may be made of an insulating material, such as a polymer or ceramic, for electrically isolating negative charging contacts 340 and positive charging contacts 342 in recess 320. In some embodiments, recess 320 may have insulating material located along the perimeter of negative charging contacts 340 and positive charging contacts 342 so as to electrically isolate each charging contact (e.g., in embodiments where inner wall 322 may be made of an electrically conductive material). While FIGS. 15 and 16 show two negative charging contacts 340 and two positive charging contacts 342, recess 320 may include any number of negative and positive charging contacts (e.g., one of each).

Negative charging contacts 340 and positive charging contacts 342 may be disposed on inner wall 322 of recess 320. In some embodiments charging contacts 340 and 342 may form a portion of inner wall 322. In some embodiments, charging contacts 340 and 342 may protrude from inner wall 322. In some embodiments, charging contacts 340 and 342 may be spring loaded. Spring loaded charging contacts 340/342 minimize the potential for small deviations in the distance between charging contact rings 250/252 and charging contacts 340/342 from disrupting electrical contact between charging contact rings 250/252 and charging contacts 340/342. In some embodiments, charging contacts 340 and 342 may be circular contact points. In some embodiments, the diameter 344 of circular contact points may be less than or equal to width(s) 282/284. Widths 282 and 284, diameter 344, and charging contacts 250/252 and 340/342 in general, should be of sufficient size so as to provide good electrical contact between charging contact rings 250/252 and charging contacts 340/342. While FIGS. 15 and 16 show charging contacts 340/342 having a circular shape, charging contacts 340/342 may have any shape, including, but not limited to, a square shape, a rectangular shape, or an elliptical shape. The size of square, rectangular, or elliptical charging contacts may be selected in a similar way the diameter 344 of circular charging contacts is selected (i.e., to provide good electrical contact with charging contact rings 250/252, but while maintaining electrical isolation of charging contacts 340/342).

As shown in FIG. 15, positive charging contacts 342 may be disposed above negative charging contacts 340, relative to distal end 306 of display stem 304. Positive charging contacts 342 and negative charging contacts 340 may be separated by a vertical distance 341 (measured in the direction of arrow 16 in FIG. 15). Vertical distance 341 may be based on the size and shape of recess 320. In some embodiments, vertical distance 341 may be equal to vertical distance 280 to facilitate contact between charging contact rings 250/252 and charging contacts 340/342 when retainer body 202 is received within recess 320. Positive charging contacts 342 and negative charging contacts 340 are also separated by a radial distance 343, which is based on the radius of curvature of the portion of inner wall 322 vertically separating charging contacts 342 and 340. In some embodiments, radial distance 343 may be equal to radial distance 281 to facilitate contact between charging contact rings 250/252 and charging contacts 340/342. The size of charging contacts 340/342 and the distances separating them (e.g., vertical distance 341 and radial distance 342 separating them) should be such that negative charging contacts 340 and positive charging contacts 342 are electrically isolated on inner wall 322. In some embodiments charging contacts 340/342 may be charging contact rings having the same or similar characteristics as charging contact rings 250/252. Moreover, in some embodiments, charging contact rings 250/252 may be charging contacts having the same or similar characteristics as charging contacts 340/342.

FIG. 16 shows a top view of display stem 304 taken from the perspective of arrow 16 in FIG. 15, showing recess 320. As shown in FIG. 16, charging contacts 340 and 342 may be disposed radially about throat area 315 of passage 314. Negative charging contacts 340 may be disposed along a first circular line 346 and positive charging contacts 342 may be disposed along a second circular line 348. First circular line 346 and the second circular line 348 may be separated by a constant vertical and radial distance corresponding to vertical distance 341 and radial distance 343, respectively.

When in electrical communication, negative charging contact ring 250 and negative charging contacts 340 may provide a negative charge (i.e., neutral/ground) to auxiliary cable 402 (via, e.g., circuitry disposed within retainer body 202). And, when in electrical communication, positive charging contact ring 252 and positive charging contacts 342 may provide a positive charge to auxiliary cable 402 (via, e.g., circuitry disposed within retainer body 202). When both negative charging contacts 250/340 and positive charging contacts 252/342 are in electrical communication, power may be provided to product 102 via auxiliary cable 402 (e.g., the battery of product 102 may be charged). In some embodiments, negative charging contacts 250/340 and positive charging contacts 252/342 may only be in electrical communication when retainer body 202 is fully seated within recess 320.

Using a pair of continuous charging contact rings (e.g., charging contact rings 250 and 252) facilitates the electrical communication between respective positive charging contacts and respective negative charging contacts regardless of the rotational orientation of retainer body 202 within recess 320 (i.e., continuous electrical communication at any orientation between 0° and 360°). In some embodiments, non-continuous charging contacts located on retainer body 202 and in recess 320 (e.g., charging contacts 340/342 and/or non-continuous charging contact rings having gaps 251) may result in electrical communication between respective positive charging contacts and respective negative charging contacts only when retainer body 202 is oriented in at least one predefined rotational orientation (e.g., 0°, 90°, 180°, and/or 270°). In some embodiments, non-continuous charging contacts located on retainer body 202 and in recess 320 may be in electrical communication at each predefined rotational orientation. In some embodiments, retainer 200 may include magnets (e.g., first magnets 228) along with negative charging contact ring 250 and positive charging contact ring 252. The magnets of retainer 200 may magnetically interact with magnets located on display stem 304 (e.g., second magnets 326) to facilitate the proper seating of retainer 200 on display stem 304 and thus facilitate electrical communication between negative charging contacts 250/340 and positive charging contacts 252/342.

In some embodiments, an alert (e.g., via indicators 254) may be activated in the event that retainer body 202 is not fully seated within recess 320, that retainer body 202 is not in a predefined orientation, and/or that product 102 is not receiving power. In some embodiments, the alert may be triggered after a predetermined amount of time (e.g., 10 minutes). This may aid a user (e.g., a retail store owner) in ensuring that products 102 are properly seated on display stem 304 and in a vertical or horizontal orientation, which may be more aesthetically appealing to potential purchasers.

FIG. 15 also shows insert 318 attached to proximal end 312 of display stem 304 according to an embodiment. Insert 318 may include fixtures 319 for receiving fasteners 311 that attach insert 318 to stem wall 310. As shown in FIG. 15, insert 318 may form throat area 315 of passage 314. A removable insert 318 may facilitate assembly and access to the interior of display stem 304 for repair and/or replacement of components of the display system 100 (e.g., circuitry associated with charging contacts 340 and 342).

Figure 17:
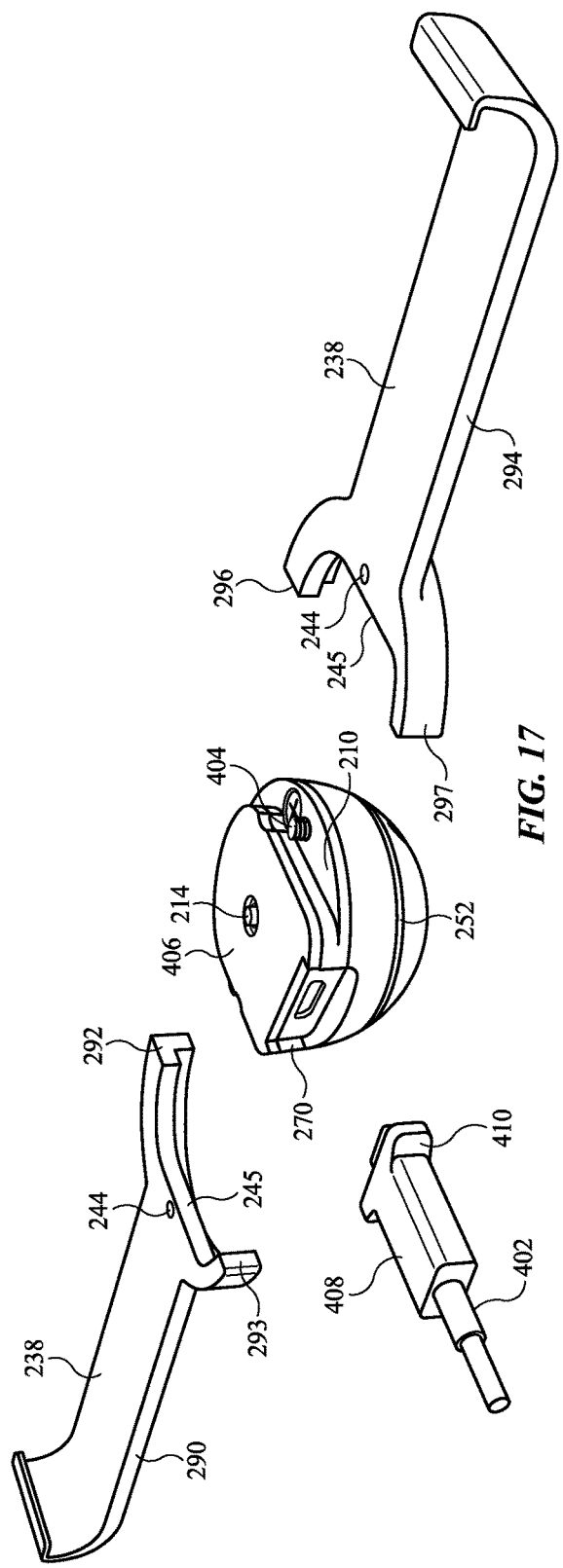
FIG. 17 shows an exploded view of a retainer according to an embodiment.
Figure 18:
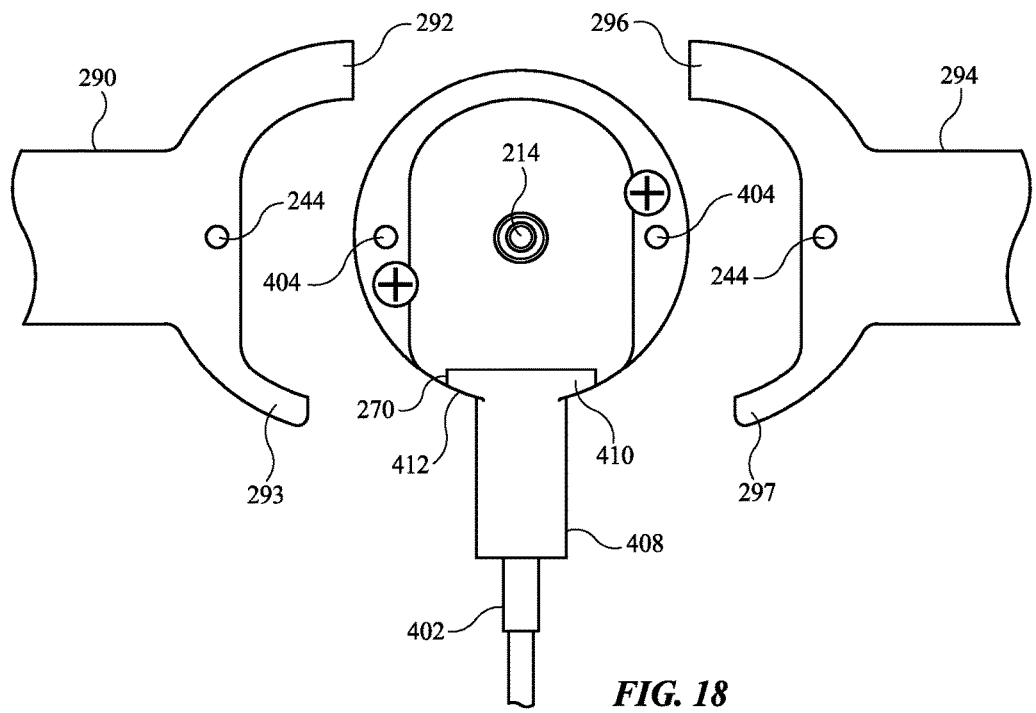
FIGS. 18 and 19 show top views of portions of a retainer in different assembly states, according to an embodiment.
Figure 19:
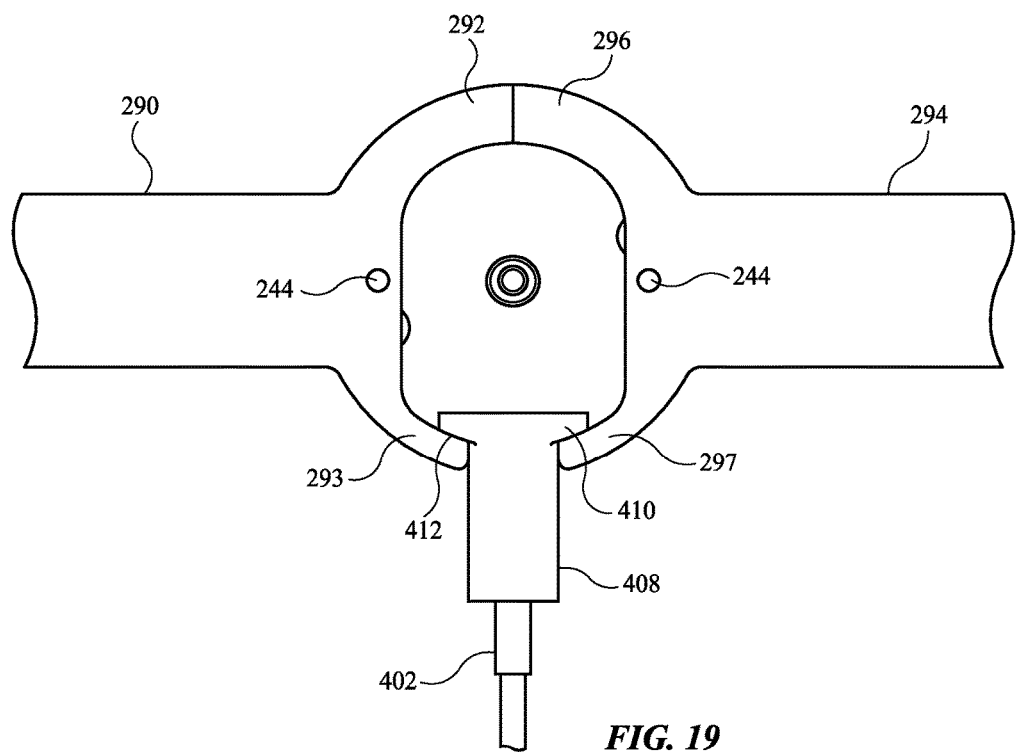

FIGS. 17-19 show a two-piece bracket 230 according to some embodiments. Two-piece bracket 230 may include first piece 290 and second piece 294, each piece including a bracket arm 238. In some embodiments first piece 290 and second piece 294 may each include a lip 245 disposed at one end thereof. Depressed area 210 on retainer body 202 may receive at least a portion of lips 245 to non-rotationally secure pieces 290 and 294 to retainer body 202 (see, e.g., FIG. 19). Pieces 290 and 294 may be assembled on retainer body 202 such that at least a portion of each piece wraps around a portion of plug recess 270 and auxiliary cable 402 plugged into cable access 208 in plug recess 270 so as to securely hold auxiliary cable 402 in connection with cable access 208, as shown in FIG. 18. This is way, auxiliary cable 402 is retained by bracket 230 and cannot be removed from retainer body 202 without removal of bracket 230 from retainer body 202.

The assembly of a retainer 200 having a two piece bracket 230 according to an embodiment is illustrated in FIGS. 18 and 19. First, auxiliary cable 402 may be plugged into plug recess 270, which includes cable access 208. As shown in FIG. 18, plug recess 270 may be sized and shaped to receive at least a portion of plug flange 410 located on plug 408. In some embodiments, plug recess 270 may receive the entire plug flange 410 such that an outer surface 412 of plug flange 410 forms a continuous surface with outer surface 218 of retainer body 202 (i.e., is flush with outer surface 218). After auxiliary cable is attached, each bracket piece 290/294 may be attached by, for example, securing fasteners 404 within holes 244.

First piece 290 may include a first coupling 292 and a second coupling 293 and second piece 294 may include a third coupling 296 and a fourth coupling 297. When pieces 290 and 294 are attached to retainer body 202, first coupling 292 and third coupling 296 may wrap around one side of retainer body 202 and contact each other (see FIG. 19). Additionally, second coupling 293 and forth coupling 297 may wrap around the other side of retainer body 202 and around at least a portion of plug recess 270 and plug flange 410. In some embodiments, second coupling 293 and fourth coupling 297 may have a shape that at least partially conforms with outer surface 412 of plug flange 410.

Once retainer 200 is assembled as shown in FIG. 19, retainer cable 328 may be attached to retainer body 202 via coupling element 222. In some embodiments, product 102 may be secured to fixing surface 206 before pieces 290/294 of bracket are assembled. In some embodiments, pieces 290/294 may be loosely assembled (e.g., by partially securing fasteners 404) before product 102 is attached to fixing surface 206 and then fully assembled after product 102 is attached to fixing surface 206 (e.g., by fully tightening fasteners 404) to fully secure product 102 on retainer 200.

Figure 20:
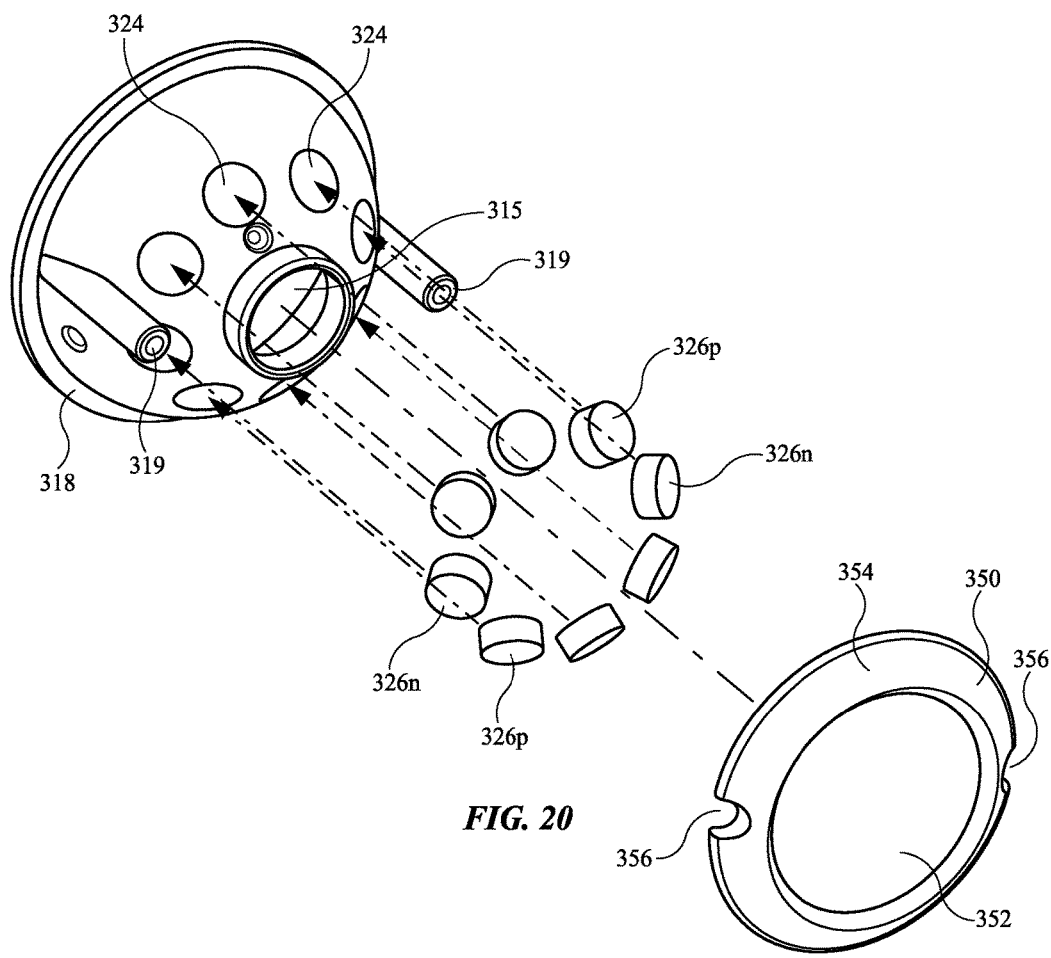
FIG. 20 shows an exploded view of part of a display stem according to an embodiment.
Figure 21:
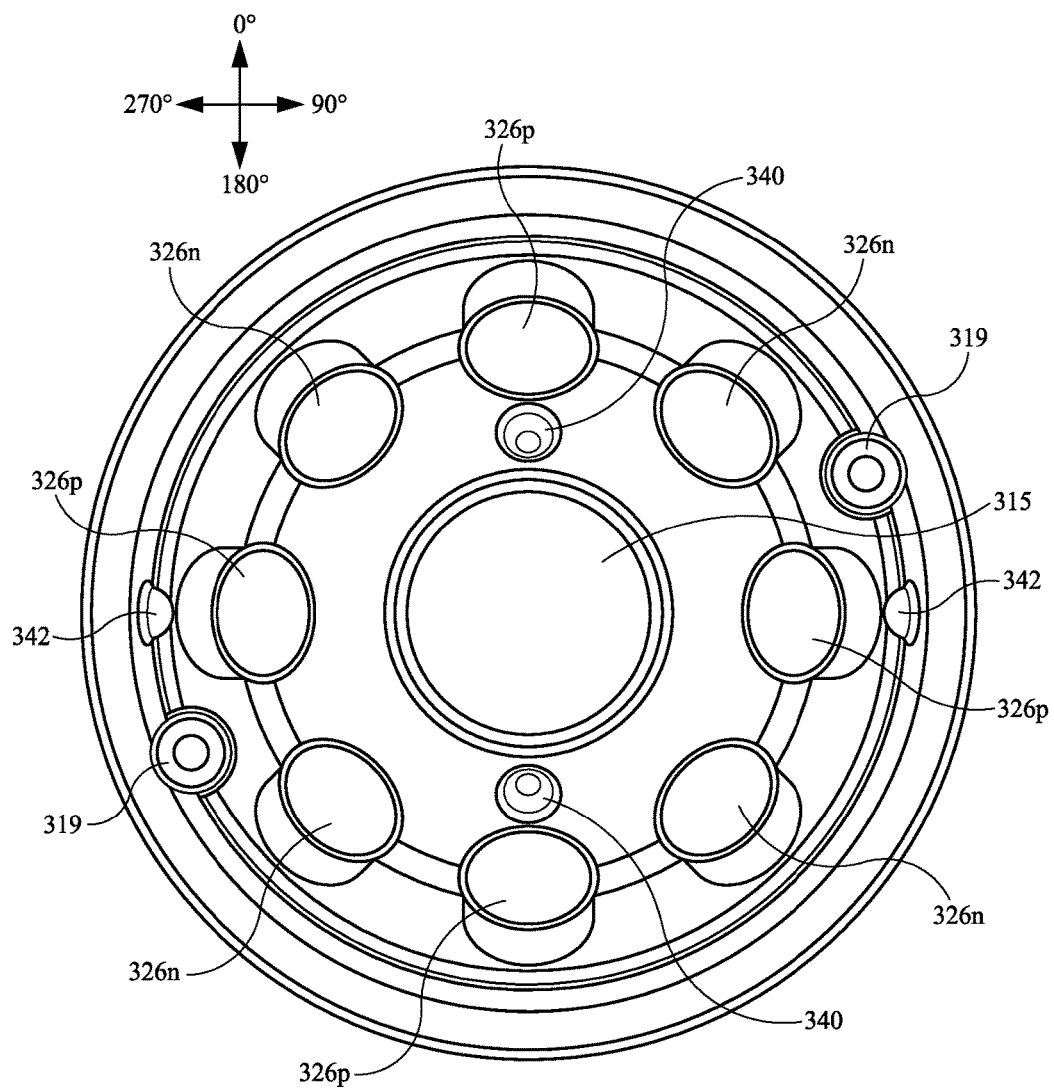
FIG. 21 shows a view of the display stem taken from the perspective of arrow 16 of FIG. 15.

FIGS. 20-23 show a configuration of first magnets 228 and second magnets 326 according to some embodiments. The configuration of first magnets 228 and second magnets 326 shown in FIGS. 20-23 results in retainer body 202 having four predetermined rotational orientations within recess 320 (0°, 90°, 180°, and 270°). As shown in FIGS. 20 and 21, insert 318 may include eight second magnets 326 disposed within eight cavities 324 located radially about throat area 315. FIG. 20 shows an exploded view of second magnets 326 and FIG. 21 shows a top view taken from the perspective of arrow 16 of FIG. 15. Inner wall 322 is removed in FIG. 22 to show different components associated with recess 320. The eight second magnets 326 disposed radially about throat area 315 in FIG. 20 have alternating polarities (i.e., alternating positive and negative polar orientations) facing inner wall 322. In other words, the eight second magnets 326 are radially disposed such that a polar negative second magnet 326n (i.e., a magnet with its negative pole oriented towards throat area 315 and rotation axis 502) is disposed between two polar positive second magnets 326p (i.e., a magnet with its positive pole oriented towards throat area 315 and rotation axis 502), and vice versa. In some embodiments each of the second magnets 326 are evenly radially spaced, as shown in FIG. 21 (e.g., the eight second magnets 326 may be positioned every 45 degrees radially about throat area 315: the four polar negative second magnets 326n may be radially spaced apart by 90 degrees, and the four polar positive second magnets 326p may be radially spaced apart by 90 degrees).

Figure 22:
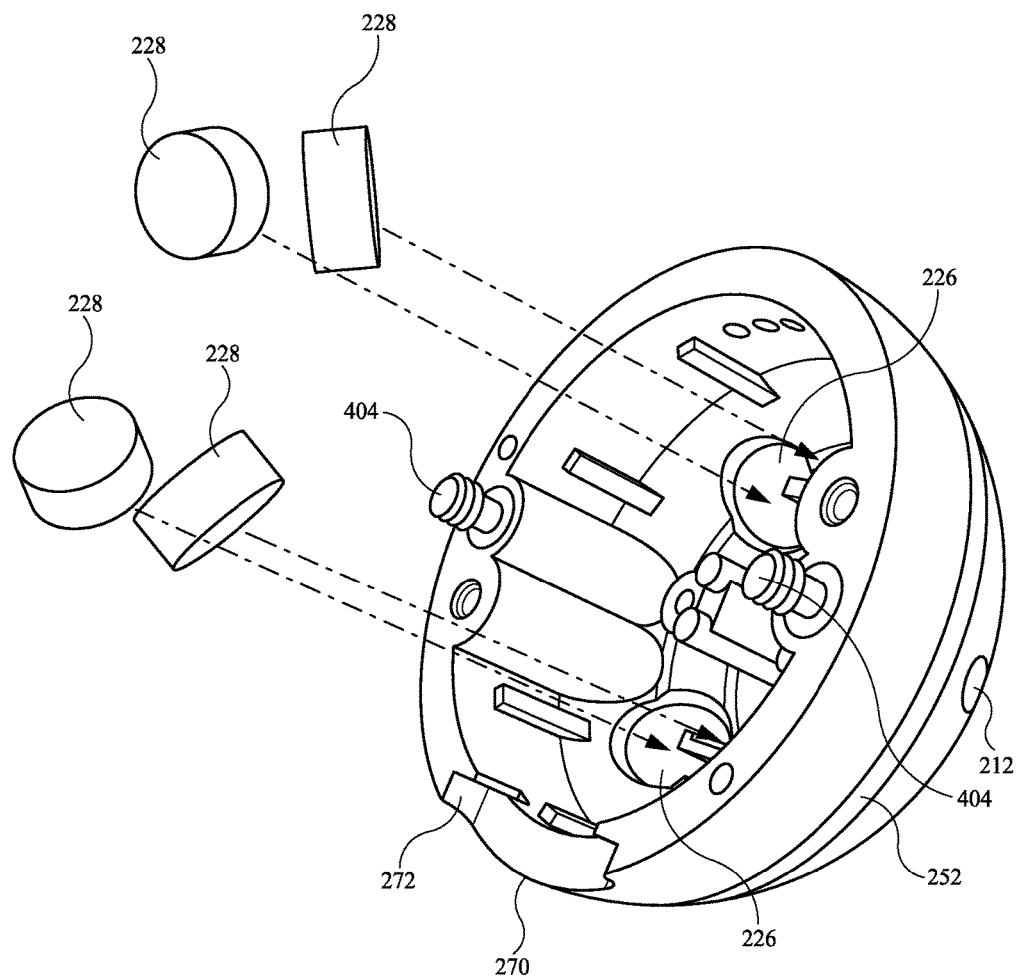
FIG. 22 shows an exploded view of part of a retainer according to an embodiment.
Figure 23:
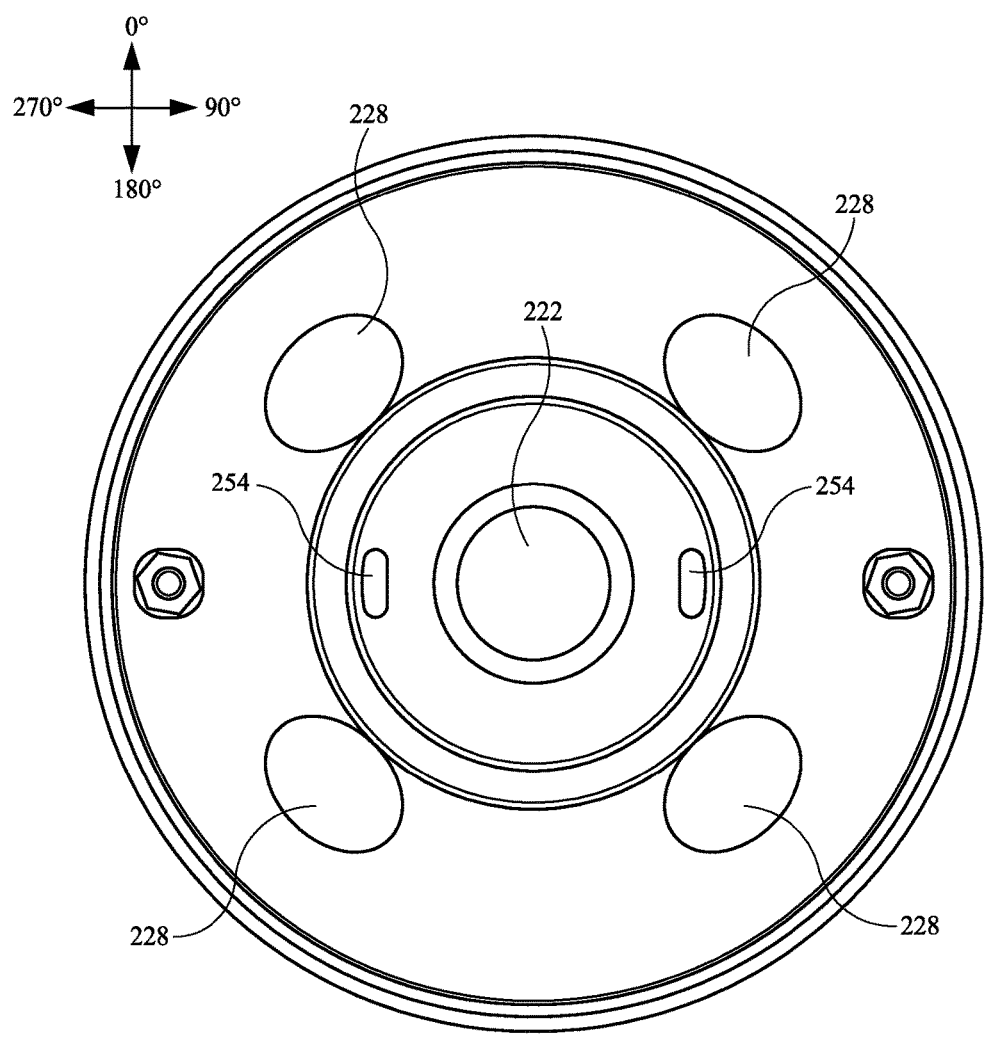
FIG. 23 shows a bottom view of a retainer according to an embodiment.

A complimentary retainer body 202 having four first magnets 228 disposed within four cavities 226 located radially about coupling element 222 is shown in FIGS. 22 and 23. Each of the four first magnets 228 shown in FIGS. 22 and 23 have the same polarity facing outer surface 218 (i.e., the same polar orientation). In some embodiments, each of the four first magnets 228 may be polar positive (i.e., a magnet with its positive pole located on outer surface 218 and oriented away from the center of retainer body 202 and rotation axis 502). In some embodiments, each of the four first magnets 228 may be polar negative (i.e., a magnet with its negative pole located on outer surface 218 and oriented away from the center of retainer body 202 and rotation axis 502). In some embodiments each of the first magnets 228 are evenly radially spaced, as shown in FIG. 23 (e.g., the four first magnets 228 may be positioned every 90 degrees radially about a center of retainer body 202 (e.g., about coupling element 222)).

Regardless of whether first magnets 228 are arranged to be polar positive or polar negative, the four first magnets 228 are configured to cause the rotation of retainer body 202 into a predetermined rotational orientation (0°, 90°, 180°, and 270°) due to magnetic attraction between the plurality of second magnets 326 having opposite polarity from the four first magnets 228. For example, assuming that 0°, 90°, 180°, 270° are defined as shown by the cross-hairs in FIGS. 21 and 23, first magnets 228 may be polar positive so as to attract polar negative second magnets 326n. While attracting polar negative second magnets 326n, polar positive first magnets 228 will also repel polar positive second magnets 326p, which also forces retainer body 202 into a predetermined orientation. Attaching product 102 on retainer 200 will, in turn, result in product 102 only being displayed in the predetermined orientations, which may in some embodiments correspond to the portrait and landscape positions for product 102. For example, FIG. 26 shows product 102 oriented at 0° (product 102A) and 180° (product 102C), which correspond to portrait positions for product 102, and at 90° (product 102B) and 270° (product 102D), which correspond to landscape positions for product 102.

As shown in FIG. 20, insert 318 may include an annulus ring 350 disposed under second magnets 326. Annulus ring 350 may include an opening 352 defined by a body 354. Body 354 may be sized and shaped to cover cavities 324 and second magnets 326 disposed therein. In some embodiments, body 354 may include slots 356 for receiving fixtures 319 to hold annulus ring 350 in position. In some embodiments, annulus ring 350 may be made of a ferretic material. In some embodiments, the ferretic material may be stainless steel, for example, 1008-1012 stainless steel. The ferretic material of annulus ring 350 may amplify the magnetic strength by uniting the opposing magnetic fields generated by first magnets 228 and second magnets 326 (i.e., magnets having positive and negative polar orientations), thereby increasing the attraction/repulsion between magnets.

Figure 24:
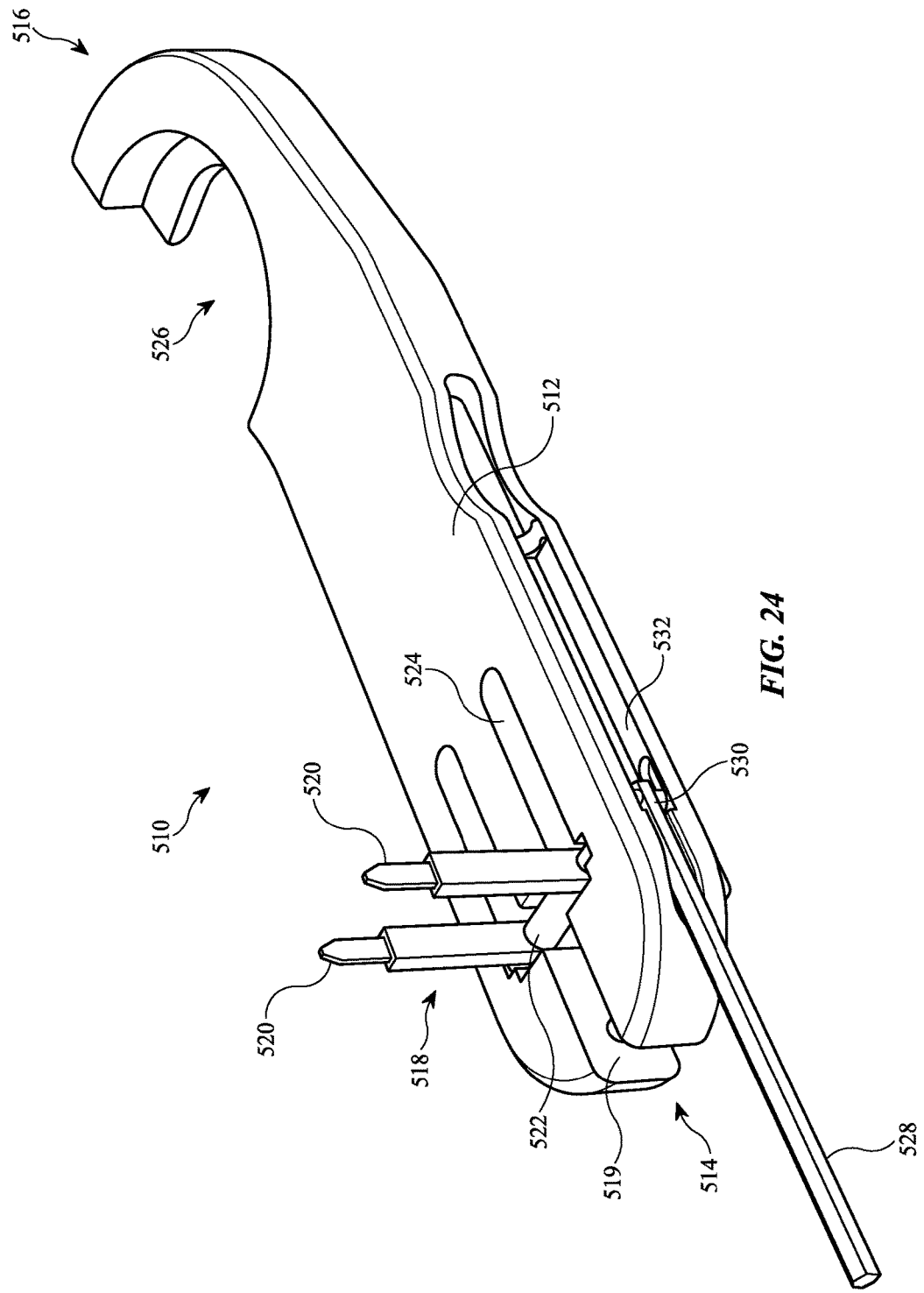
FIG. 24 shows a disconnect tool according to an embodiment.

FIG. 24 shows a tool 510 for attaching and/or detaching components of retainer 200 and for detaching retainer cable 328 from retainer 200 according to some embodiments. Tool 510 may include a disconnect tool 518 that is insertable into disconnect apertures 254 on retainer body 202 to release end 329 of retaining cable 328 from coupling element 222. Disconnect tool 518 may include any number of pins (e.g., two pins 520) hingedly connected to a body 512 of tool 510 via a hinge 522. Pins 520 may be received in grooves 524 on body 512 when not in use. Pins 520 may have a shape corresponding to the shape of disconnect apertures 254 on retainer body 202. In some embodiments, pins 520 and disconnect apertures 254 may have an irregular or non-rotationally symmetric shape. In some embodiments, tool 510 may also include a notch 519 located adjacent to hinge 522 on a proximal end 514 of tool 510. Notch 519 may be sized and shaped to receive retaining cable 328 so that pins 520 can be inserted into disconnect apertures 254 while retaining cable 328 is disposed within notch 519 (see FIG. 25).

Tool 510 may also include other tools, such as a gripping tool 526 and an attachment tool 528 (e.g., an Allen wrench or a screwdriver head) for assembling/disassembling retainer 200. Griping tool 526 may be located at a distal end 516 of tool 510 and may be used to break an adhesive bond between fixing surface 206 and the backside 104 of product 102. Gripping tool 526 may be configured to slide under a portion of retainer body 202 so that a user can apply force to retainer body 202, similar to the way a nail is removed using the claw of a hammer head. Attachment tool 528 may be used to tighten or loosen fasteners 404 for attaching or detaching bracket 230 from retainer body 202. In some embodiments, attachment tool 528 may be hingedly connected to body 512 via a hinge 530 and may be received within a recess 532 when not in use.

Figure 25:
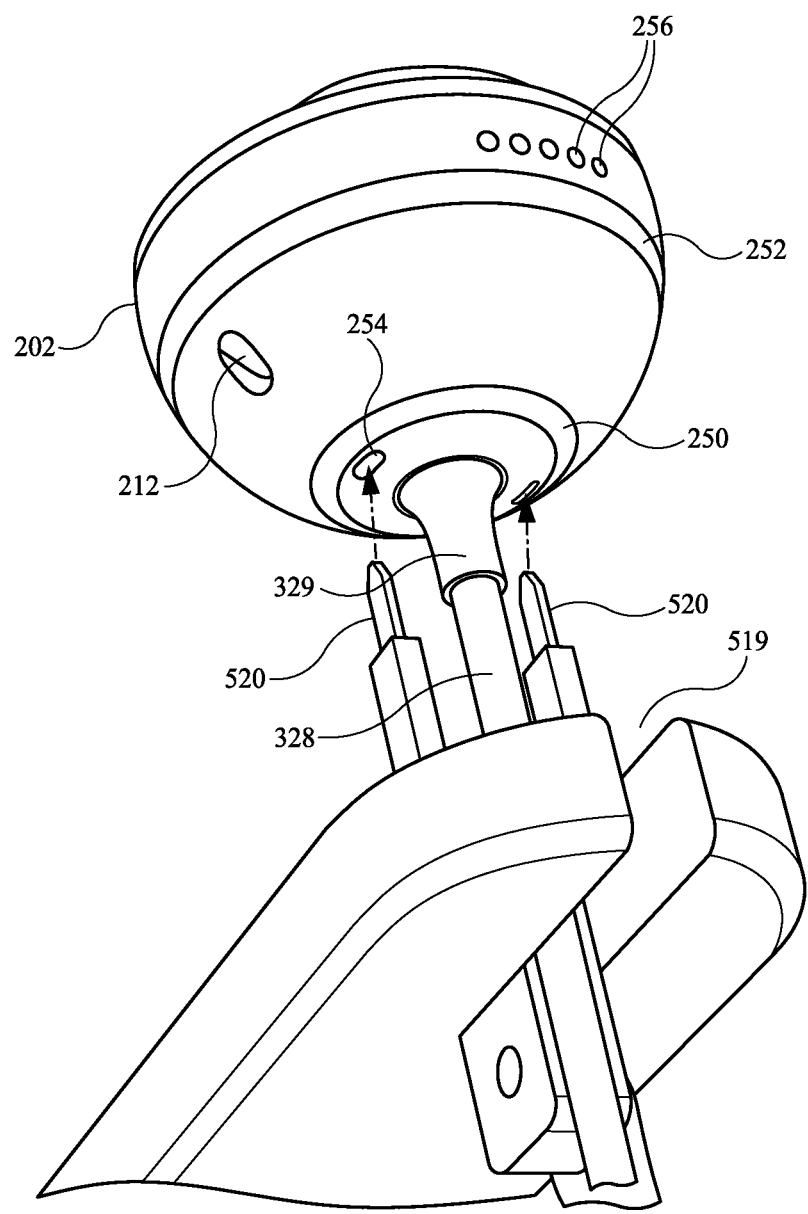
FIG. 25 shows the operation of a disconnect tool according to an embodiment.

The operation of tool 510 will now be described in reference to FIG. 25. When retainer cable 328 is attached to retainer body 202, notch 519 may be placed around retainer cable 328 and pins 520 may be aligned with disconnect apertures 254. Then pins 520 may be inserted into disconnect apertures 254. When pins 520 are received within disconnect apertures 254, pins 520 may actuate a release mechanism 255 (see FIG. 14) located within retainer body 202 to release end 329 from coupling element 222. In some embodiments, the release mechanism 255 may only be actuated when pins 520, having a shape corresponding to disconnect apertures 254, are simultaneously inserted into disconnect apertures 254. Once retainer cable 328 is released, notch 519 may hold end 329 so that retractor 330 does not immediately pull retaining cable 328 towards display stem 304.

The foregoing description, for purposes of explanation, used specific nomenclature to provide a thorough understanding of the described embodiments. However, it will be apparent to one skilled in the art that many of the specific details are not required in order to practice the described embodiments. Thus, the foregoing descriptions of the specific embodiments described herein are presented for the purposes of illustration and description. They are not target to be exhaustive or to limit the embodiments to the precise forms disclosed. It will be apparent to one of ordinary skill in the art that many modifications and variations are possible in view of the above teachings. For example, U.S. patent application Ser. No. 13/652,038, filed Oct. 15, 2012, titled "Methods and Systems for Displaying a Product (inventors Howarth et al.) includes some similar and corresponding elements to those described herein, and the features described therein may be applicable to those elements described herein as would be appreciated by one of skill in the art. U.S. patent application Ser. No. 13/652,038 is incorporated herein by reference thereto.

The Detailed Description section is intended to be used to interpret the claims. The Summary and Abstract sections may set forth one or more but not all exemplary embodiments of the present invention as contemplated by the inventors, and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A display system for displaying a product, the system comprising:
  a retainer for retaining the product, the retainer comprising:
    a retainer body, wherein at least a portion of the retainer body defines a hemispherical shape; and
    a bracket attached to the retainer body, the bracket comprising at least two bracket arms configured to extend around opposing sides of the product; and
  a display stem defining a hemispherical recess at a proximal end thereof, the hemispherical recess shaped to receive the hemispherical portion of the retainer body, p1 wherein the hemispherical recess is configured to allow the retainer body to rotate 360 degrees while the hemispherical portion of the retainer body is received within the hemispherical recess.

2. The display system of claim 1, wherein the hemispherical recess is shaped to receive the entire hemispherical portion of the retainer body.

3. The display system of claim 1, wherein the recess defines an opening located at a bottom of the recess, and wherein the hemispherical recess is configured to allow the retainer body to rotate 360 degrees about an axis that extends through the center of the opening.

4. The display system of claim 1, further comprising a retaining cable attached to the retainer body, wherein the retaining cable extends through an opening in the recess of the display stem.

5. The display system of claim 4, wherein the retaining cable is coupled to a retraction mechanism, the retraction mechanism configured to apply tension to the retaining cable to automatically retract the retaining cable, when the hemispherical portion of the retainer body is not in the hemispherical recess of the display stem.

6. The display system of claim 5, wherein the retraction of the cable causes the hemispherical portion of the retainer body to enter the hemispherical recess of the display stem.

7. The display system of claim 1, wherein a majority of the hemispherical portion of the retainer body conforms exactly to the shape of the hemispherical recess of the display stem.

8. A display system for displaying a product, the system comprising:
- a retainer for retaining the product, the retainer comprising:
  - a retainer body having at least one first magnet coupled thereto; and
  - a bracket attached to the retainer body, the bracket comprising at least two bracket arms configured to extend around opposing sides of the product; and
- a display stem defining a recess at a proximal end thereof, the recess defining an opening located at the bottom of the recess, and the display stem comprising at least one second magnet disposed adjacent to the opening,
- wherein the at least one first magnet is configured to cause rotation of the retainer body to a predefined orientation when at least a portion of the retainer body is disposed within the recess of the display stem, if the retainer body is not in the predefined orientation, and
- wherein the at least one first magnet is configured to cause the rotation by magnetic attraction to the at least one second magnet.

9. The display system of claim 8, further comprising a retaining cable attached to the retainer body, wherein the retaining cable extends through the opening in the recess of the display stem.

10. The display system of claim 9, wherein the at least one first magnet comprises a plurality of first magnets disposed radially about the retaining cable.

11. The display system of claim 9, wherein the at least one second magnet comprises a plurality of second magnets disposed radially about the opening.

12. The display system of claim 8, wherein the retainer has more than one predefined orientation with respect to the display stem.

13. The display system of claim 8, comprising at least two first magnets and at least two second magnets, wherein the at least two first magnets are disposed equidistant from each other about a center axis of the retainer body, and the at least two second magnets are disposed equidistant from each other about the opening in the recess.

14. A display system for retaining a product, the display system comprising:
- a retainer comprising:
  - a retainer body having a peak area, a base area, and a substantially smooth curved outer surface, wherein at least a portion of the substantially smooth curved outer surface has a continuously changing slope extending from the peak area to the base area and wherein the continuously changing slope has a constant curvature,
  - a retaining cable attached to the retainer body, and
  - a bracket attached to the retainer body, the bracket comprising at least two bracket arms configured to retain the product with respect to the retainer; and
- a display stem defining a recess at a proximal end thereof, the recess comprising a shape that matches the shape of the substantially smooth curved outer surface of the retainer body,
- wherein the retainer body rotates to a predefined orientation with respect to the display stem when at least a portion of the retainer body is received within the recess of the display stem, if the retainer body is not in the predefined orientation, and
- wherein the retainer has more than one predefined orientation with respect to the display stem.

15. The display system of claim 14, wherein the continuously changing slope has a continuously increasing slope.

16. The display system of claim 14, wherein the substantially smooth curved outer surface is hemispherical.

17. The display system of claim 14, wherein the base area is immediately adjacent the bracket.

18. The display system of claim 14, wherein the proximal end of the display stem comprises a circular perimeter shape.

19. The display system of claim 14, wherein the substantially smooth curved outer surface of the retainer body comprises a positive shape protruding from the base area of the retainer body and the shape of the recess comprises a negative shape recessed below the proximal end of the display stem, and
- wherein the positive shape of the substantially smooth curved outer surface is the same as the negative shape of the recess.

20. The display system of claim 14, wherein the retainer has four predefined orientations with respect to the display stem.

21. The display system of claim 20, wherein the four predefined orientations are separated by 90 degrees of rotation of the retainer body within the recess.

22. The display system of claim 14, wherein the retainer body is hidden from view when the retainer body is received within the recess of the display stem.

23. The display system of claim 14, further comprising a product fixed to the retainer by the bracket.

24. The display system of claim 23, wherein the display stem comprises an exterior shape selected from the group consisting of: a cylindrical shape and a frustoconical shape, and
- wherein the exterior shape of the display stem comprises a maximum diameter that is smaller than a maximum width and a maximum length of the product fixed to the retainer.

25. A display system for displaying a product, the system comprising:
- a retainer for retaining the product, the retainer comprising a retainer body comprising a plurality of first magnets; and
- a display stem defining a recess and an opening at a proximal portion thereof, the display stem comprising a plurality second magnets disposed adjacent to the opening, the plurality of second magnets having alternating positive and negative polar orientations,
- wherein the plurality of first magnets cause rotation of the retainer body to at least one predefined orientation when at least a portion of the retainer body is disposed within the recess of the display stem, if the retainer body is not in the predefined orientation, and
- wherein the plurality of first magnets cause the rotation by magnetic attraction to a plurality of the second magnets having the opposite polarity as the plurality of first magnets.

26. The display system of claim 25, wherein the retainer has a plurality predefined orientations with respect to the display stem, and wherein the predefined orientations are based on the positions of the first and second magnets.

27. The display system of claim 26, wherein the predefined orientations are radially separated by at least 90 degrees of rotation of the retainer body within the recess.

28. The display system of claim 26, wherein the predefined orientations are radially separated by 90 degrees of rotation of the retainer body within the recess.

29. The display system of claim 25, wherein the first magnets are evenly radially spaced about a central axis of the retainer.

30. The display system of claim 25, wherein the first magnets are radially spaced about a central axis of the retainer at 90 degree intervals.

31. The display system of claim 25, wherein the second magnets are evenly radially spaced about a central axis of the display stem.

32. The display system of claim 25, wherein the second magnets are radially spaced about the display stem at 45 degree intervals.

33. The display system of claim 25, wherein the first magnets are radially spaced about a central axis of the retainer at 90 degree intervals, and
wherein the second magnets are radially spaced about the display stem at 45 degree intervals.

34. A display system for displaying a product, the system comprising:
a retainer for retaining the product, the retainer comprising:
a retainer body comprising a plurality of first magnets coupled to the retainer body, wherein at least a portion of the retainer body defines a hemispherical shape, and
a bracket attached to the retainer body, the bracket comprising at least two bracket arms configured to extend around opposing sides of the product; and
a display stem defining a recess at a proximal end thereof and comprising a plurality of second magnets coupled to the display stem, wherein the recess defines a hemispherical shape configured to receive the hemispherical portion of the retainer body and defines an opening located at the bottom of the recess,
wherein the plurality of second magnets are disposed adjacent to the opening defined by the recess, and
wherein the plurality of first magnets are configured to cause rotation of the retainer body to a predefined orientation by magnetic attraction to the plurality of second magnets when at least a portion of the retainer body is disposed within the recess of the display stem, if the retainer body is not in the predefined orientation.

35. The display system of claim 34, further comprising a retaining cable attached to the retainer body and extending through the opening defined by the recess of the display stem.

36. The display system of claim 35, wherein the plurality of second magnets are disposed radially about the opening.

37. The display system of claim 34, wherein the retainer body comprises a plug recess inset from an outer surface of the retainer body for receiving at least a portion of an auxiliary cable.

38. The display system of claim 34, further comprising a support surface, wherein the display stem is coupled to the support surface and extends from the support surface at an oblique angle.

39. A display system for retaining a product, the display system comprising:
a retainer comprising:
a retainer body having a peak area, a base area, and a substantially smooth curved outer surface, wherein at least a portion of the substantially smooth curved outer surface has a continuously changing slope extending from the peak area to the base area and wherein the continuously changing slope has a constant curvature,
a retaining cable attached to the retainer body, and
a bracket attached to the retainer body, the bracket comprising at least two bracket arms configured to retain the product with respect to the retainer; and
a display stem defining a recess at a proximal end thereof, the recess comprising a shape that matches the shape of the substantially smooth curved outer surface of the retainer body,
wherein the retainer body comprises a first charging contact disposed on the substantially smooth curved outer surface of the retainer body and the recess comprises a second charging contact disposed on an interior surface of the recess, and
wherein the first charging contact and the second charging contact are in electrical communication when the retainer body is received within the recess of the display stem.

40. The display system of claim 39, wherein the retainer body is rotatable between a plurality of predefined orientations with respect to the display stem when the retainer body is received within the recess of the display stem, and
wherein the first charging contact and the second charging contact are in electrical communication at each predefined orientation.

41. The display system of claim 39, wherein the retainer body is rotatable with respect to the display stem when the retainer body is received within the recess of the display stem, and
wherein the first charging contact and the second charging contact are in electrical communication when the retainer body is received in the recess at any orientation of the retainer body with respect to the recess.

42. The display system of claim 39, wherein the retaining cable extends through an opening in the recess of the display stem, and
wherein the first charging contact comprises a charging contact ring disposed radially about a location of attachment between the retaining cable and the retainer body.

43. A display system for displaying a product, the system comprising:
a retainer for retaining the product, the retainer comprising:
a retainer body, wherein at least a portion of the retainer body defines a hemispherical shape; and
a bracket attached to the retainer body, the bracket comprising at least two bracket arms configured to extend around opposing sides of the product; and
a display stem defining a hemispherical recess at a proximal end thereof, the hemispherical recess shaped to receive the hemispherical portion of the retainer body,
wherein the hemispherical recess provides power to the retainer through a charging contact disposed on a surface of the hemispherical recess when the retainer body is received within the hemispherical recess.

44. The display system of claim 43, wherein the retainer comprises a charging contact ring extending around an outer surface of the retainer body that receives the power from the charging contact disposed on the surface of the hemispherical recess.

45. The display system of claim 43, wherein the retainer body is rotatable with respect to the display stem when the hemispherical portion of the retainer body is received within the hemispherical recess.

46. The display system of claim 43, further comprising a retaining cable attached to the retainer body, wherein the retaining cable extends through an opening in the hemispherical recess of the display stem.

* * * * *

UNITED STATES PATENT AND TRADEMARK OFFICE
CERTIFICATE OF CORRECTION

PATENT NO. : 10,206,522 B2
APPLICATION NO. : 14/600607
DATED : February 19, 2019
INVENTOR(S) : Yang et al.

Page 1 of 1

It is certified that error appears in the above-identified patent and that said Letters Patent is hereby corrected as shown below:

In the Claims

In Column 24, Claim 1, Line 39, delete "p1 wherein" and insert -- wherein --, therefor.

Signed and Sealed this
Seventh Day of May, 2019

Andrei Iancu
*Director of the United States Patent and Trademark Office*